(12) United States Patent
Faaborg et al.

(10) Patent No.: US 9,306,882 B2
(45) Date of Patent: Apr. 5, 2016

(54) MANAGEMENT AND PRESENTATION OF NOTIFICATION CONTENT

(71) Applicant: Google Inc., Mountain View, CA (US)

(72) Inventors: Alexander Faaborg, Mountain View, CA (US); John Nicholas Jitkoff, Kingsville, TX (US); Daniel Marc Gatan Shiplacoff, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/594,450

(22) Filed: Jan. 12, 2015

(65) Prior Publication Data
US 2016/0028667 A1   Jan. 28, 2016

Related U.S. Application Data

(63) Continuation of application No. 14/337,789, filed on Jul. 22, 2014, now Pat. No. 8,954,521.

(51) Int. Cl.
*G06F 15/16* (2006.01)
*H04L 12/58* (2006.01)

(52) U.S. Cl.
CPC .................................. *H04L 51/046* (2013.01)

(58) Field of Classification Search
USPC ............. 348/468; 715/748, 752, 766; 725/93; 709/203, 206, 217, 219, 224
See application file for complete search history.

(56) References Cited

U.S. PATENT DOCUMENTS

| | | |
|---|---|---|
| 8,059,170 B2 | 11/2011 | Hii et al. |
| 8,233,885 B2 | 7/2012 | Kansal et al. |
| 8,295,819 B1 | 10/2012 | Kaplan et al. |
| 2002/0031262 A1 | 3/2002 | Imagawa et al. |
| 2007/0067738 A1 | 3/2007 | Flynt et al. |
| 2007/0240079 A1 | 10/2007 | Flynt et al. |
| 2009/0124283 A1 | 5/2009 | Himeno |
| 2009/0271705 A1 | 10/2009 | Sheng et al. |
| 2010/0271546 A1* | 10/2010 | Stalaw .......................... 348/468 |
| 2012/0072957 A1* | 3/2012 | Cherukuwada et al. ........ 725/93 |

(Continued)

FOREIGN PATENT DOCUMENTS

| CN | 101917512 A | 12/2010 |
|---|---|---|
| EP | 1585296 A2 | 10/2005 |

OTHER PUBLICATIONS

Senders picture on incoming messages?—biteSMS, downloaded from http://forums.bitesms.com/forums/2/topics/1055?page=2, part 1, 3 pages, downloaded on May 5, 2014.

(Continued)

*Primary Examiner* — Quang N Nguyen
(74) *Attorney, Agent, or Firm* — Shumaker & Sieffert, P.A.

(57) ABSTRACT

An example method includes, responsive to receiving an indication of an incoming communication, identifying, by a computing device, first and second portions of an image that are associated with respective first and second portions of a face of a human user, wherein the human user has been determined to be an originator of the incoming communication. The example method further includes outputting, by the computing device and for display, the first and second portions of the image that are associated with the respective first and second portions of the face of the human user, and outputting, by the computing device and for display, message content associated with the incoming communication, such that the message content as displayed at least partially overlays the second portion of the image.

14 Claims, 12 Drawing Sheets

(56) References Cited

U.S. PATENT DOCUMENTS

| | | | |
|---|---|---|---|
| 2013/0072221 A1* | 3/2013 | Chen et al. | 715/748 |
| 2013/0198666 A1* | 8/2013 | Matas et al. | 715/766 |
| 2013/0242031 A1 | 9/2013 | Petterson et al. | |
| 2013/0346882 A1 | 12/2013 | Shiplacoff et al. | |
| 2014/0066031 A1 | 3/2014 | Pfeffer | |
| 2014/0136987 A1* | 5/2014 | Rodriguez | 715/752 |

OTHER PUBLICATIONS

Senders picture on incoming messages?—biteSMS, downloaded from http://forums.bitesms.com/forums/2/topics/1055?page=2, part 2, 8 pages, downloaded on May 5, 2014.

Contact picture when recieving sms—biteSMS, downloaded from http://forums.bitesms.com/forums/2/topics/386?page=2, part 1, 5 pages, downloaded on May 5, 2014.

Contact picture when recieving sms—biteSMS, downloaded from http://forums.bitesms.com/forums/2/topics/386, part 2, 5 pages, downloaded on May 5, 2014.

FriendSync for Facebook—Free download and software reviews—CNET Download.com. downloaded from http://download.cnet.com/FriendSync-for-Facebood/3000-12941_4-10915131.html, 7 pages, downloaded on May 5, 2014.

Stinson, "Google Reveals How the Android Wear UI Will Work," Downloaded from http://www.wired.com/20141-6/google-reveals-more-android-wear-details/, 3 pages, Jun. 20, 2014.

How to Overlay Chat on Your Live Stream, ATB Community, http://bwana.tv/forums/threads/how-to-overlay-chat-on-your-live-stream.42103/, 18 pages, downloaded on May 2, 2014.

iReaISMS, Professional SMS on your iPhone—Features, downloaded from http://irealsms.com/features, 3 pages, downloaded on May 5, 2014.

U.S. Appl. No. 14/337,789, filed Jul. 22, 2014 by Alexander Faaborg.

Notice of Allowance from U.S. Appl. No. 14/337,789, mailed Oct. 9, 2014 9 pp.

International Search Report and Written Opinion from International Application No. PCT/US2015/040147, dated Sep. 17, 2015, 11 pp.

* cited by examiner

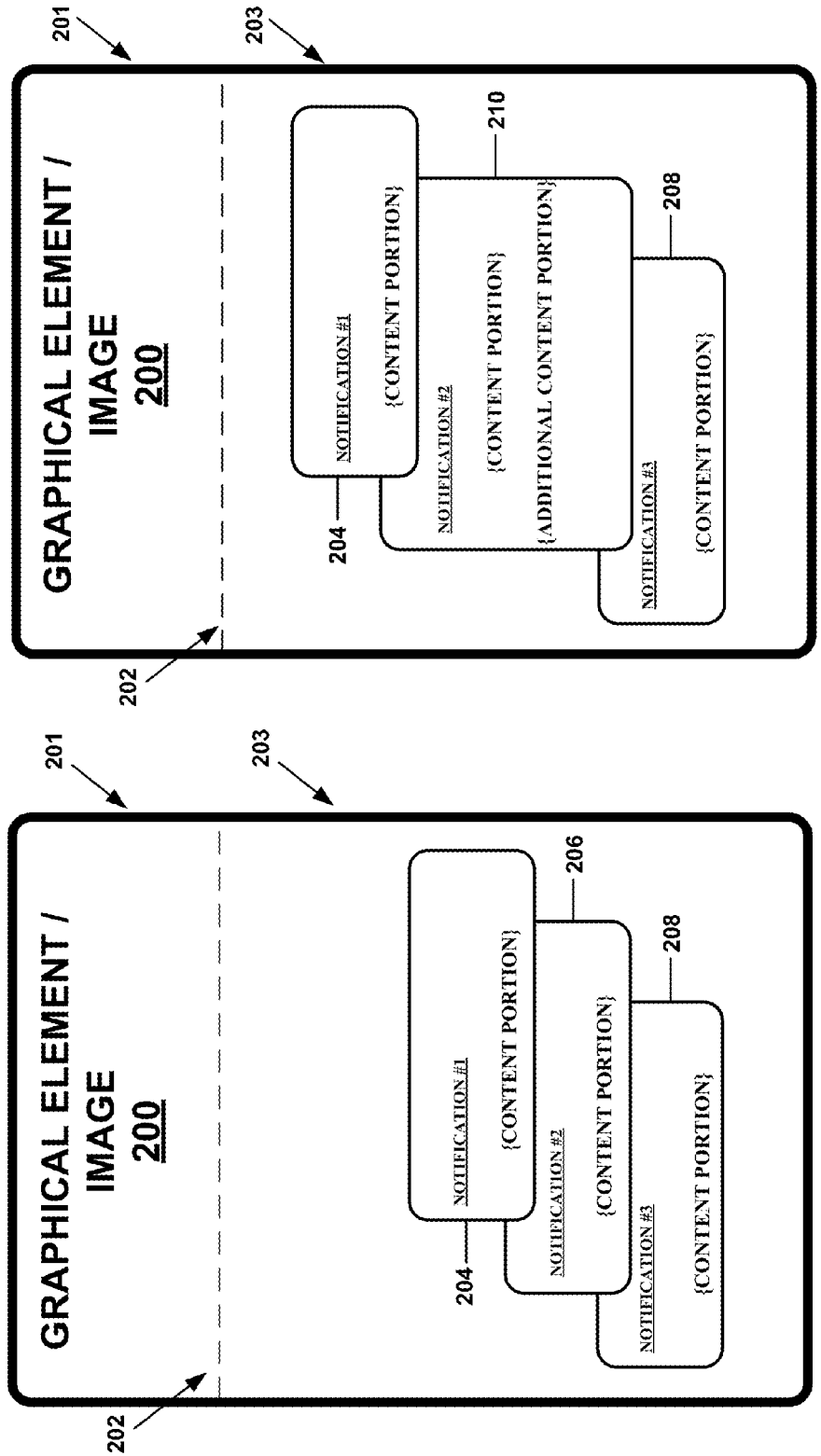

MANAGEMENT AND PRESENTATION OF NOTIFICATION CONTENT

This application is a Continuation of application Ser. No. 14/337,789, filed on Jul. 22, 2014 (now U.S. Pat. No. 8,954,521, issued on Feb. 10, 2015), the entire contents of which are hereby incorporated by reference in their entirety.

BACKGROUND

A computing device may process notifications that are generated by one or more applications executed by the computing device or by other external computing devices. As the quantity of applications increases, the quantity of notifications processed by the computing device may also increase, which can complicate the management and presentation of notification content associated with these notifications. For example, the amount of notification content displayed to a user at one time may be limited by a size of a screen used to display the content. Limiting the amount of notification content displayed at a given time may require the computing device to replace or overwrite certain content with other content. For example, the computing device may potentially replace content that includes more important information with content that includes less important information. Furthermore, as the displayed amount of notification content increases, it may become more difficult for a user to identify particular content or the sources of such content.

SUMMARY

In one example, a method includes, responsive to receiving an indication of an incoming communication, identifying, by a computing device, first and second portions of an image that are associated with respective first and second portions of a face of a human user, wherein the human user has been determined to be an originator of the incoming communication. The method further includes outputting, by the computing device and for display, the first and second portions of the image that are associated with the respective first and second portions of the face of the human user, and outputting, by the computing device and for display, message content associated with the incoming communication, such that the message content as displayed at least partially overlays the second portion of the image.

In another example, a method includes, responsive to receiving a notification, identifying, by a computing device, first and second portions of a graphical element, wherein the graphical element represents an application that has been determined to be an originator of the notification. The method further includes outputting, by the computing device and for display, the first and second portions of the graphical element, and outputting, by the computing device and for display, content associated with the notification, such that the content as displayed at least partially overlays the second portion of the graphical element.

In another example, a computer-readable storage medium is encoded with instructions that, when executed, cause at least one processor to perform operations comprising, responsive to receiving an indication of an incoming communication, identifying first and second portions of an image that are associated with respective first and second portions of a face of a human user, wherein the human user has been determined to be an originator of the incoming communication. The operations further comprise outputting, for display, the first and second portions of the image that are associated with the respective first and second portions of the face of the human user, and outputting, for display, message content associated with the incoming communication, such that the message content as displayed at least partially overlays the second portion of the image.

In another example, a computing device comprises at least one processor. The at least one processor is configured to, responsive to receiving an indication of an incoming communication, identify first and second portions of an image that are associated with respective first and second portions of a face of a human user, wherein the human user has been determined to be an originator of the incoming communication. The at least one processor is further configured to output, for display, the first and second portions of the image that are associated with the respective first and second portions of the face of the human user, and output, for display, message content associated with the incoming communication, such that the message content as displayed at least partially overlays the second portion of the image.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 10A and 10B are conceptual diagrams that illustrate an example of multiple instances of content that at least partially overlays a portion of a graphical element or image, in accordance with one or more aspects of the present disclosure.

DETAILED DESCRIPTION

Figure 1A:
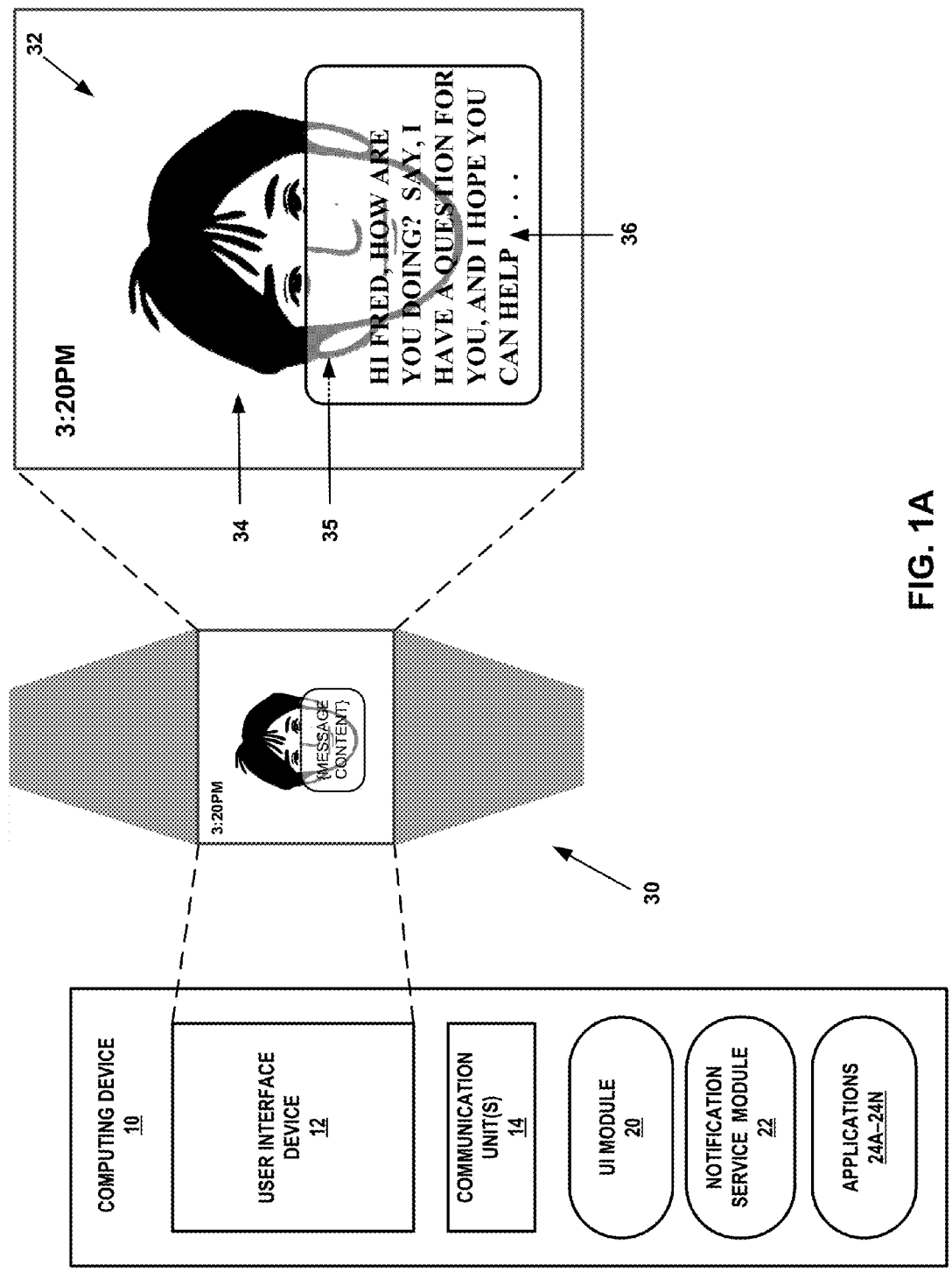
FIG. 1A is a conceptual diagram illustrating an example computing device that is configured to output notification content, in accordance with one or more aspects of the present disclosure.

Examples described in this disclosure relate to techniques for managing and presenting notification content. For example, a computing device may, in response to receiving a notification or a corresponding communication, identify first and second portions of an image or a graphical element. These portions may, in some examples, be associated with respective first and second portions of a face of a human user. The computing device may output, for display at a display device, the first and second portions of the image or graphical element, and may further output content included in the notification or otherwise associated with the corresponding communication, such that the content as displayed at least partially overlays the second portion of the image or graphical element. As a result, both a portion of the image or graphical element and a portion of the content may be viewable at the same time, and a viewer (e.g., user of the computing device) may be able to identify the originator of the notification or corresponding communication.

As one example, the computing device may output message content for display in a region of a display device that is adjacent to and beneath the first portion of the image. This first portion of the image may be associated with a first portion of a face that includes both eyes of a human user who has been determined to be an originator of the incoming communication. In some instances, the computing device may perform a facial recognition process to identify the first portion of the image. The computing device may output the message content such that it is displayed in a manner that at least a portion of it appears overlaid on the second portion of the image, but leave the first portion of the image exposed (e.g., from the originator's eyes up) to allow a viewer of the display device (e.g., user of the computing device) to view the message content yet also identify the originator of the communication.

In some examples, and as will be described in further detail below, the computing device may also adjust or otherwise determine an amount of notification content that is to be output for display based on an importance or priority of the content. For example, if the computing device determines that first notification content associated with a first notification has a higher importance or priority than second notification content associated with a second notification, the computing device may output both the first and second notification content, but may output a larger amount of the first notification content as compared to the second notification content. As a result, the user of the computing device may be able to visually identify that the first notification content has higher importance or priority, and may be able to view a larger quantity of content associated with the first notification.

Techniques of this disclosure may provide one or more advantages. For example, techniques of this disclosure may provide improved management of content associated with notifications and may help ensure that a user obtains sufficient information from a presentation of a notification. Not only may a user be able to view various different portions of notification content at the same time, the user may also be able to potentially identify an originator of a notification or corresponding communication, as well. Better presentation, management, and customization of notifications may provide a better user experience and may require fewer inputs from a user to perform actions in response to notifications, which may result in an improved user experience as well as potential power and/or bandwidth efficiencies for the computing device.

FIG. 1A is a conceptual diagram illustrating an example computing device 10 that is configured to output notification content, in accordance with one or more aspects of the present disclosure. Examples of computing device 10 may include, but are not limited to, a mobile phone, a tablet computer, a personal digital assistant (PDA), a laptop computer, a portable gaming device, a portable media player, an e-book reader, a wearable computing device (e.g., a watch, a wrist-mounted computing device, a head-mounted computing device), a television platform, or other type of computing device. As will be described in further detail below, computing device 10 may be or include one or more processors. Computing device 10 may be attached or otherwise coupled to a wristband 30 worn by a user.

As shown in FIG. 1A, computing device 10 includes a user interface device (UID) 12. UID 12 may function as an input device and/or an output device for computing device 10. UID 12 may be implemented using various technologies. For instance, UID 12 may function as an input device using a presence-sensitive input device, such as a resistive touchscreen, a surface acoustic wave touchscreen, a capacitive touchscreen, a projective capacitance touchscreen, a pressure-presence-sensitive screen, an acoustic pulse recognition touchscreen, or another presence-sensitive technology. UID 12 may function as an output device using any of one or more display devices, such as a liquid crystal display (LCD), dot matrix display, light emitting diode (LED) display, organic light-emitting diode (OLED) display, e-ink, or similar monochrome or color display capable of outputting visible information to a user of computing device 10.

As one example, UID 12 of computing device 10 may include a presence-sensitive screen that may receive tactile input from a user of computing device 10. UID 12 may receive indications of the tactile input by detecting one or more gestures from a user of computing device 10 (e.g., the user touching or pointing to one or more locations of UID 12 with a finger or a stylus pen). The presence-sensitive screen of UID 12 may also present output to a user. UID 12 may present the output as or in a graphical user interface, which may be associated with functionality provided by computing device 10. For example, UID 12 may present various user interfaces of applications 24A-24N (collectively, "applications 24") executing at computing device 10. A user may interact with a respective user interface of each of applications 24 to cause computing device 10 to perform operations relating to corresponding application functionality.

In some examples, computing device 10 may include one or more communication units 14. Communication units 14 may send data to and/or receive data from one or more other computing devices. In some examples, communication units 14 support wireless and/or wired communication. Communication units 14 may send and/or receive data using any variety of communication protocols.

Computing device 10 may also include user interface ("UI") module 20, notification service module 22, and applications 24. Modules 20, 22 and applications 24 may perform operations described herein using software, hardware, firmware, or a mixture of hardware, software, and firmware residing in and/or executing at computing device 10. Computing device 10 may execute modules 20, 22 and applications 24 using one or more processors. Computing device 10 may, in some cases, execute modules 20, 22 and applications 24 as one or more virtual machines executing on underlying hardware. Modules 20, 22 and applications 24 may be implemented in various ways. For example, any of modules 20, 22 and/or applications 24 may be implemented as a downloadable or pre-installed application or "app." Modules 20, 22 and applications 24 may also, in some examples, execute as a service of an operating system or computing platform.

Applications 24 of computing device 10 may perform various functions or access one or more services for computing device 10. An e-mail application, a calendar application, a messaging application, a social media application, a travel application, a game application, a stock application, and a weather application are all examples of applications 24. UI module 20 may cause UID 12 to present a graphical user interface to a user. For example, the graphical user interface may include graphical elements (e.g., indications) displayed at various locations of UID 12. As described herein, a messaging application may be any type of application that processes one or more messages that are each associated with message content. The message content associated with any given message may include textual content and/or one or more other forms of media content (e.g., image content, video content, audio content). The messages may, in various examples, comprise one or more communications. In some cases, the messages may comprise instant messages.

In various examples, one or more of applications 24 may generate one or more corresponding notifications. These notifications may include or otherwise be associated with notification content and may be processed by notification service module 22. Notification service module 22 may execute as an application and/or as a service of, for example, an operating system or computing platform of computing device 10. Notification service module 22 may perform functions associated with receiving, managing, and otherwise handling some, or all, of the notifications that are generated by applications 24 and/or received by computing device 10 via communication units 14 from services and applications executing remote to computing device 10 (e.g., at a server or network cloud, at computing device 11 shown in FIG. 1B). As one example, when application 24A generates a notification, notification service module 22 may receive and process the notification, and provide content associated with the notification to UI module 20.

UI module 20 may, in some cases, act as an intermediary between various components of computing device 10 to make determinations based on input detected by UID 12 and to generate output presented by UID 12. For instance, UI module 20 may receive information from UID 12 related to input detected by UID 12 and transmit the input information to one or more of applications 24. UI module 20 may also receive notification information and/or content from notification service module 22, which corresponds to one or more notifications received by notification service module 22 (e.g., notifications generated by applications 24). UI module 20 may provide notification content and/or other information associated with the notifications to UID 12 for output to a user.

Figure 1B:
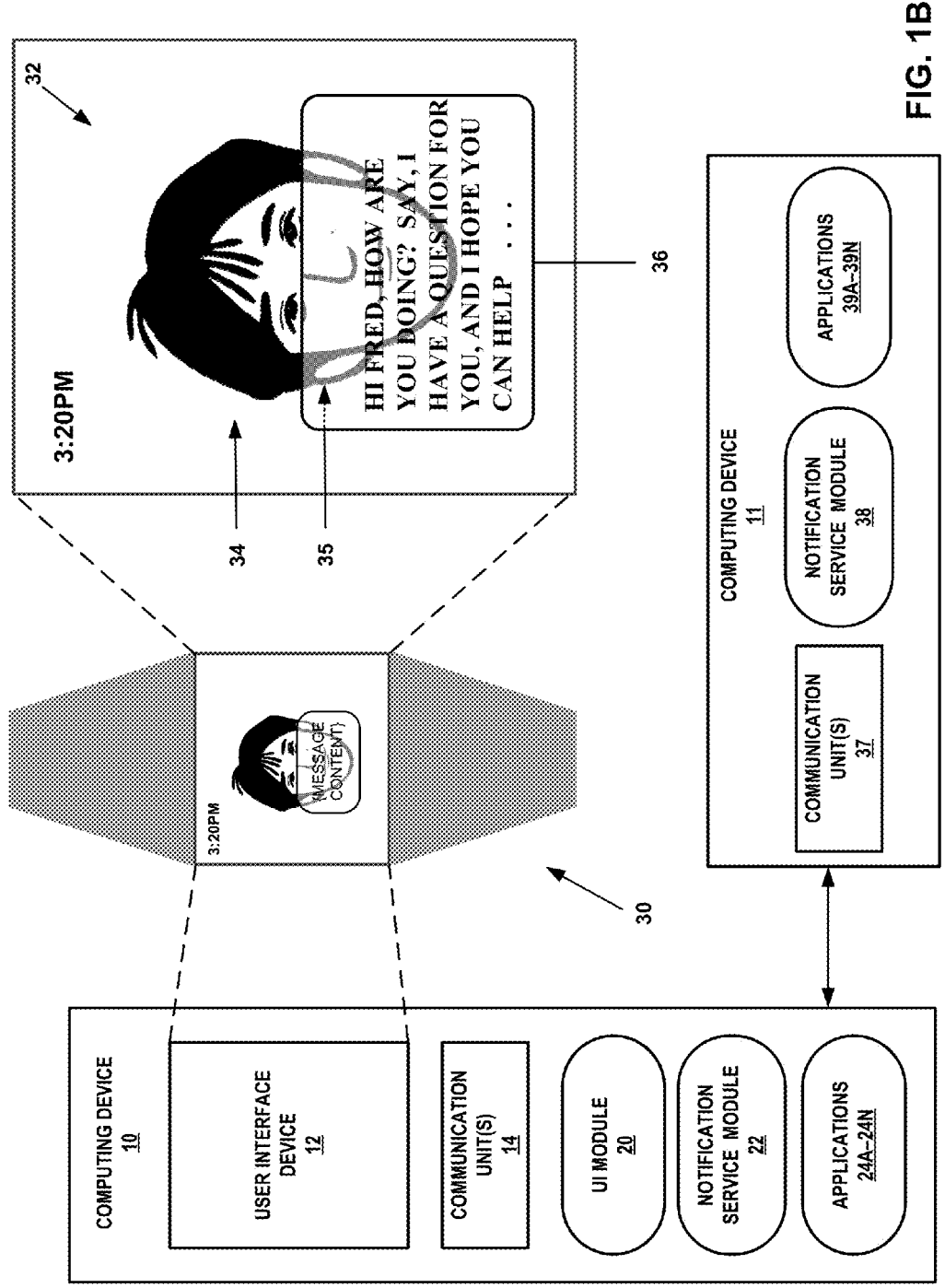
FIG. 1B is a conceptual diagram illustrating another example of a computing device that communicates with an external computing device, in accordance with one or more aspects of the present disclosure.

For example, if application 24A is an email or a messaging application, application 24A may receive an indication of an incoming communication from an external device via communication units 14 (e.g., an external device executing a similar email or messaging application, computing device 11 shown in FIG. 1B). To notify a user of the receipt of the communication, application 24A may generate and send a notification to notification service module 22. Notification service module 22 may receive the notification, process the notification, and send corresponding notification content to UI module 20. UI module 20 may receive this notification content from notification service module 22 and cause UID 12 output the content for display.

Computing device 10 may receive an indication of an input detected UID 12, where the input corresponds to a selection of one or more portions of the notification content that is output for display at UID 12. For example, a user may perform a gesture with one or more fingers at a location of UID 12. UI module 20 may receive information about the input from UID 12 and determine that the input occurred at a location corresponding to at least a portion of the notification content.

UI module 20 may send data associated with the input (e.g., information about one or more gesture events) to notification service module 22. Notification service module 22 may determine, based on the data from UI module 20, that the input represents an input from a user to select certain content for the notification. In response, notification service module 22 may provide additional notification content to UI module 20 for purposes of display by UID 12. In some instances, notification service module 22 may also provide event information to application 24A indicative of the user input to select certain content, such that application 24A may implement further actions or functionality.

In the particular example shown in FIG. 1A, it is assumed that notification service module 22 receives a notification from one of applications 24 related to a message. As noted above, application 24A may comprise an email or a messaging application. Application 24A may receive an indication of an incoming communication. To notify a user of the receipt of the incoming communication, application 24A may generate and send a notification to notification service module 22. This notification may include content associated with the incoming communication. For instance, the notification content may include an indication of the name of the account associated with the incoming communication (e.g., a name of the originator of the communication), which may allow, in some instances, application 24A and/or notification service module 22 to determine the originator of the communication. The notification content may also include a subject and one or more additional words associated with the communication.

Notification service module 22 may receive the notification, process the notification, and send information associated with the notification, including the notification content and any other related information, to UI module 20. UI module 20 may receive this information from notification service module 22 and cause UID 12 output the information for display.

In the example of FIG. 1A, the notification content includes message content associated with the incoming communication, as well as an image 32 (or a link to image 32) that represents a face of a human user who has been determined (e.g., by application 24A, notification service module 22, and/or a device external to computing device 10) to be the originator of the communication. For example, if the incoming communication was originated by a person named "John Jones," image 32 is a representation of the face of "John Jones." Message content 36 may include one or more portions of the message that is associated with the incoming communication.

In some examples, the incoming communication may include image 32 and/or message content 36, which is included in the notification content provided by application 24A to notification service module 22. In other examples, application 24A and/or notification service module 22 may obtain one or more portions of image 32 and/or message content 36 based on the information contained in the incoming communication. For example, application 24A may retrieve one or more portions of image 32 and/or message content 36 from an external server or computing device (e.g., computing device 11 shown in FIG. 1B) based on the information contained in the incoming communication (e.g., information that identifies an address, link, or other source data associated with the external server/device). In some instances, application 24A may have previously stored one or more portions of image 32 in a local data repository, and may retrieve or otherwise have access to the one or more portions of image 32 in response to receiving the incoming communication, as will be described in further detail below.

In many instances, it may be helpful to output image 32 of the originator of the incoming communication contemporaneously with at least a portion of message content 36, such that a viewer of UID 12 (e.g., the user of computing device 10) may be able to more quickly identify the originator of the communication. However, based on certain limitations that may exist with respect to a size of UID 12 (e.g., size of a presence-sensitive screen), it may be difficult to output an entirety of image 32 along with message content 36 at the same time. As a result, UID 12 may overlay at least a portion of message content 36 onto image 32. However, it may also be undesirable to cover a substantial portion of image 32 representing the originator's face, such that a viewer of UID 12 (e.g., the user of computing device 10) is unable to accurately identify the originator. For example, it may be potentially difficult for the user of computing device 10 to identify the originator if the viewable portions of image 32 include only portions that correspond to certain features such as the forehead or hair, but does not include additional identifying features.

Thus, in one or more examples, notification service module 22 may identify first and second portions 34, 35 of image 32 that are associated with respective first and second portions of the face of a human user. In the example of FIG. 1A, the human user is "John Jones," who has been determined (e.g., by application 24A, notification service module 22, and/or a device external to computing device 10) to be the originator of the incoming notification. To allow a viewer of UID 12 (e.g., user of computing device 10) to sufficiently identify the face of "John Jones," notification service module 22 may identify first portion 34 of image 32 that is associated at least with both eyes of "John Jones" (where the first portion of the face includes the eyes). In this example, second portion 35 of image 32 is associated with a second portion of the face of "John Jones," which includes a nose and mouth. As a result, a viewer (e.g. the user of computing device 10) may be able to identify "John Jones" as the originator of the incoming communication by viewing a display of image 32 that includes first portion 34, where first portion 34 is associated at least with both eyes of "John Jones."

In some examples, notification service module 22 and/or another module (e.g., image processing module 54 shown in FIG. 2) may perform image recognition on image 32 in order to identify first and second portions 34, 35 of image 32. For example, notification service module 22 may implement any known method of facial recognition to identify these portions of the face in image 32. In certain examples, a device external to computing device 10 (e.g., computing device 11 of FIG. 1B) may perform the image/facial recognition on image 32 and provide information related to first and second portions 34, 35 of image 32 to notification service module 22 via communication units 14. In these examples, notification service module 22 may provide the external device with image 32 or a reference to image 32.

In other examples, notification service module 22 may already have access to location information for features of the face of the human user (e.g., "John Jones"), where the location information associates each of the facial features with a corresponding region at which the respective facial feature is represented in image 32. In these examples, notification service module 22 or an external device may have previously performed image/facial recognition on image 32, and notification service module 22 may have stored corresponding location information in a local repository. For instance, notification service module 22 may have previously processed other incoming communications originated from "John Jones," and may have previously identified first and second portions 34, 35 of the image associated with the respective portions of the face of "John Jones." By utilizing the previously stored location information, notification service module 22 avoids the image/facial recognition process for previously identified images.

In still other examples, rather than utilizing any image/facial recognition processes, notification service module 22 may instead split image 32 of "John Jones" into distinct portions based on image size. For instance, notification service module 22 may split image 32 into top and bottom portions of predefined sizes (e.g., equal sizes), where it is assumed that the top portion of image 32 is likely associated with a portion of the face that includes both eyes, and the bottom portion is likely associated with a portion of the face that includes the nose and mouth.

Notification service module 22 provides notification content associated with the incoming communication to UI module 20, which includes image 32, or a reference to image 32 (e.g., if image 32 is stored in a local data repository of computing device 10), as well as an identification of first and second portions 34, 35 of image 32, as will be described in further detail below. The notification content further includes at least a portion of message content 36 associated with the incoming communication.

UI module 20 interacts with UID 12, and outputs the notification content for display by UID 12. In particular, as shown in FIG. 1A, UI module 20 outputs first portion 34 of image 32 for display by UID 12, and further outputs second portion 35 of image 32, where first portion 34 and second portion 35 are associated with the respective first and second portions of the face of "John Jones." However, as shown in FIG. 1A, UI module 20 further outputs message content 36 associated with the incoming communication, such that message content 36 as displayed by UID 12 at least partially overlays second portion 35 of image 32. In this particular example, message content 36 is output for display in a region of UID 12 that is adjacent to and beneath first portion 34. As a result, both first portion 34 of image 32 and message content 36 are viewable by the user of computing device 10 at substantially the same time. In addition, because first portion 34 includes one or more features of the face of "John Jones" (e.g., both eyes), the user may potentially be able to quickly identify the originator of the message as "John Jones."

In FIG. 1A, message content 36 overlays second portion 35 of image 32. In some cases, message content 36 may completely block second portion 35 from view by the user of computing device 10, such that the user may not be able to see any of second portion 35. However, in some other cases, message content 36 may be at least partly translucent, such that message content 36, as displayed, may at least partially expose second portion 35 of image 32 for view by the user.

In some examples, one or more of the actions described above as being performed by notification service module 22 may be performed by one or more other modules or applications. For instance, one or more of such actions may be performed by UI module 20 or one or more of applications 24.

Although shown in FIG. 1A as textual content, message content 36 may include any form of content (e.g., one or more of textual content, image content, video content, audio content) associated with a corresponding one of applications 24, where at least a portion of a representation of message content 36 at least partially overlays second portion 35 of image 32. For example, if application 24A is an email application, message content 36 may include any form of email-related content. In another non-limiting example, if application 24A is a messaging application, message content 36 may include any form of messaging content.

Computing device 10 may receive an indication of an input detected UID 12, where the input corresponds to a selection of one or more portions of the notification content that is output for display at UID 12. For example, a user may perform a gesture with one or more fingers at a location of UID 12. UI module 20 may receive information about the input from UID 12 and determine that the input occurred at a location corresponding to message content 36. In this case, the user may wish to view additional message content not initially included in message content 36.

UI module 20 may send data associated with the input (e.g., information about one or more gesture events) to notification service module 22. Notification service module 22 may determine, based on the data from UI module 20, that the input represents an input from a user to select message content 36. In response, notification service module 22 may provide additional content and/or information associated with the notification to UI module 20 for purposes of display by UID 12. In some instances, notification service module 22 may also provide event information to application 24A indicative of the user input to select certain content, such that application 24A may implement further actions or functionality.

In some situations, notification service module 22 may receive a notification having content that is not necessarily associated with a human originator. For example, if application 24A is a weather, stock, travel, game, calendar, or social media application, application 24A may generate and send corresponding weather, stock, travel, game, calendar, or social media notifications to notification service module 22. Unlike messaging content for messaging notifications, the content for other types of notifications is not necessarily associated with a human originator.

Thus, in certain examples, in response to notification service module 22 receiving a notification from one of applications 24 (e.g., application 24A), notification service module 22 and/or UI module 20 identifies first and second portions of a graphical element, wherein the graphical element represents an application that has been determined (e.g., by application 24A, notification service module, and/or a device external to computing device 10) to be associated with an originator of the notification. The graphical element may comprise a graphical representation of the application (e.g., an icon). UI module 20 may output the first and second portions of the graphical element for display at UID 12. In addition, UI module 20 may output content included in the notification for display at UID 12, such that the content as displayed at least partially overlays the second portion of the graphical element. As a result, both the first portion of the graphical element and the content are viewable by the user of computing device 10 at substantially the same time, and the user may potentially be able to quickly identify the originator of the notification more quickly.

In some examples, notification service module 22 receive multiple different notifications are each originated by the same entity. For example, if application 24A is a weather application that generates weather-related notifications, notification service module 22 may receive multiple weather-related notifications over that each originate from the same application 24A. If application 24A is an email or messaging application, notification service module 22 may receive multiple messaging notifications over time from application 24A, where the messaging notifications are based on incoming communicated originated from the same human user (e.g., "John Jones").

In these examples, notification service module 22 may process a first notification in a fashion similar to that described above, such that UI module 20 outputs first and second portions of a graphical element or image, where the graphical element or image has been determined to be associated with an originator of a corresponding notification and/or incoming communication. UI module 26 also outputs content for display at UID 12, where the content at least partially overlays the second portion of the graphical element or image.

At a later point in time, notification service module 22 may process a second notification that includes second content, where the second notification or corresponding communication has the same originator. UI module 20 may output, for display at UI D12, the second content such that it at least partially overlays the second portion of the graphical element or image. In certain cases, notification service module 22 and/or UI module 20 may determine, based on a priority associated with the displayed content, the amount of content to output for display, as will be further described in more detail below.

Some of these techniques may provide for potentially improved management of content associated with notifications 18 and may help ensure a user can obtain sufficient information from notifications 18 when computing device 10 presents notification center 16. Not only may a user be able to view various different portions of notification content at the same time, the user may also be able to potentially identify an originator of a notification or corresponding communication, as well. Better management and configuration of notifications 18 may result in fewer inputs from a user to perform functions with computing device 10. As a result, computing device 10 may perform fewer operations associated with a function and in turn, consume less electrical power.

FIG. 1B is a conceptual diagram illustrating another example of computing device 10 that communicates with an external computing device 11, in accordance with one or more aspects of the present disclosure. In the example of FIG. 1B, computing device 10 may operate similarly to that described in reference to FIG. 1A. However, in FIG. 1B, computing device 10 is further communicatively coupled to an external computing device, namely computing device 11. Examples of computing device 11 may include, but are not limited to, a mobile phone, a tablet computer, a PDA, a laptop computer, a portable gaming device, a portable media player, an e-book reader, a wearable computing device (e.g., a watch, a wrist-mounted computing device, a head-mounted computing device), a television platform, or other type of computing device. Computing device 11 may be or include one or more processors.

Computing device 11 includes one or more communication units 37, a notification service module 38, and one or more applications 39A-39N (collectively, "applications 39"). Communication units 37, notification service module 38, and applications 39 of computing device 11 may function similarly to communication units 14, notification service module 22, and applications 24, respectively, of computing device 10. In some cases, computing device 11 may include one or more additional components, such as a user interface device and a user interface module, which may function similarly to UID 12 and UI module 20 of computing device 10.

Communication units 14 of computing device 10 and communication units 37 of computing device 11 may each send data to and/or receive data from one or more other computing devices. Communication units 14 and 37 each may support wireless and/or wired communication, and may each send and/or receive data using any variety of communication protocols. In some examples, communication units 14 and 37 may allow computing devices 10 and 11, respectively, to communicate with each other using short-range communication (e.g., near-field communication, other forms of short-range wireless communication).

In the example of FIG. 1B, if application 39A is an email or a messaging application, application 39A may receive an indication of an incoming communication from an external device via communication units 37 (e.g., an external device executing a similar email or messaging application). Application 39A may generate and send a notification to notification service module 38. Notification service module 38 may receive the notification and process the notification internally. In certain other cases, application 39A may generate and send notifications to notification service module 38 for processing, where such notifications are generated directly by application 39A during its execution. In these examples, computing device 11 may function similarly to that of computing device 10 as described in FIG. 1A.

However, in various examples, in addition to processing notifications internally, notification service module 38 may also send notifications to notification service module 22 of computing device 10 (e.g., via communication units 37 of computing device 11 and communication units 14 of computing device 10, respectively). For example, if application 39A generated and sent a notification to notification service module 38 based on an incoming communication determined (e.g., by application 39A and/or notification service module 38) to be originated from "John Jones," notification service module 38 may send the notification to notification service module 22 of computing device 10 for processing, similar to that described in reference to FIG. 1A. This notification may have notification content that includes message content associated with the incoming communication, as well as an image 32 (or a link to image 32) that represents a face of "John Jones." The message content (e.g., message content 36 shown in FIG. 1A) may include one or more portions of the message that is associated with the incoming communication.

In some examples, the incoming communication may include image 32 and/or message content 36, which is included in the notification content provided by notification service module 38 to notification service module 22. In other examples, application 39A and/or notification service module 38 may obtain one or more portions of image 32 and/or message content 36 based on the information contained in the incoming communication. For example, application 39A may retrieve one or more portions of image 32 and/or message content 36 from an external server based on the information contained in the incoming communication (e.g., information that identifies an address, link, or other source data associated with the external server/device). In some instances, application 39A may have previously stored one or more portions of image 32 in a local data repository, and may retrieve or otherwise have access to the one or more portions of image 32 in response to receiving the incoming communication.

In some examples, notification service module 38 and/or another module (e.g., image processing module 54 shown in FIG. 2) may perform image recognition on image 32. For example, notification service module 38 may implement any known method of facial recognition on image 32. In certain examples, a device external to computing device 11 may perform the image/facial recognition on image 32. In these examples, notification service module 38 may provide the external device with image 32 or a reference to image 32.

In other examples, notification service module 38 may already have access to location information for features of the face of the human user (e.g., "John Jones"), where the location information associates each of the facial features with a corresponding region at which the respective facial feature is represented in image 32. In these examples, notification service module 38 or an external device may have previously performed image/facial recognition on image 32, and notification service module 38 may have stored corresponding location information in a local repository.

Notification service module 38 may provide the notification associated with the incoming communication to notification service module 22 of computing device 10 for processing in a manner similar to that described in reference to FIG. 1A. This notification may comprise an indication the incoming communication. The notification may include message content 36 and/or image 32, or a reference to message content 36 and/or image 32 (e.g., if message content 36 and/or image 32 is stored in a local data repository of computing device 11 or on an external server). Responsive to receiving the notification, notification service module 22 of computing device 10 may identify first portion 34 and second portion 35 of image 32, such that message content 36 as displayed may at least partially overly second portion 35 of image 32, as described in reference to FIG. 1A.

Thus, according to the example of FIG. 1B, various operations may be performed by computing device 11 in combination with computing device 10. For example, computing device 10 may not, in certain cases, directly receive incoming communications (e.g., emails) and/or perform image recognition techniques, which may instead be performed by computing device 11. Computing device 11 may generate notifications associated with these incoming communications and send such notifications to computing device 10 for processing. Computing device 10 may identify first portion 34 and second portion 35 of image 32 based on a given notification, output first and second portions 34, 35 of image 32 for display, and output message content 36 for display, such that message content 36 as displayed at least partially overlays second portion 35 of image 32.

Figure 2:
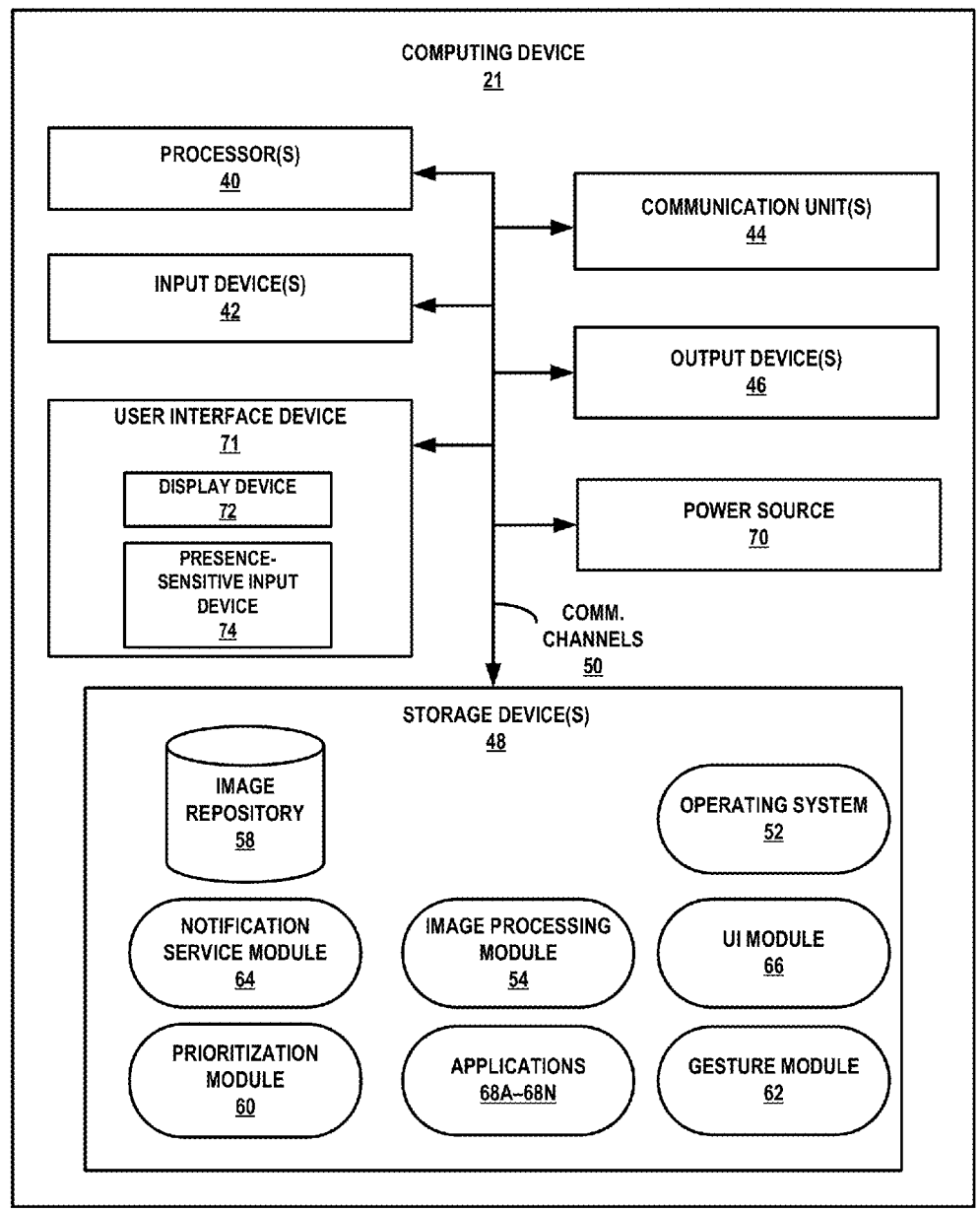
FIG. 2 is a block diagram illustrating an example computing device, in accordance with one or more aspects of the present disclosure.

FIG. 2 is a block diagram illustrating an example computing device 21, in accordance with one or more aspects of the present disclosure. Computing device 21 of FIG. 2 is described below within the context of FIGS. 1A and 1B. Computing device 21 may comprise one example of computing device 10 and/or computing device 11. FIG. 2 illustrates only one particular example of computing device 21, and many other examples of computing device 21 may be used in other instances and may include a subset of the components included in example computing device 21 or may include additional components not shown in FIG. 2.

As shown in the example of FIG. 2, computing device 21 includes user interface device 71 ("UID 71"), one or more processors 40, one or more input devices 42, one or more communication units 44, one or more output devices 46, power source 70, and one or more storage devices 48. Storage devices 48 of computing device 21 also include UI module 66, notification service module 64, applications 68A-68N (collectively, "applications 68"), gesture module 62, image processing module 54, prioritization module 60, operating system 52, and image repository 58. Communication channels 50 may interconnect each of the components 40, 42, 44, 46, 48, 70, and 71 for inter-component communications (physically, communicatively, and/or operatively). In some examples, communication channels 50 may include a system bus, a network connection, an inter-process communication data structure, or any other method for communicating data between hardware and/or software.

One or more input devices 42 of computing device 21 may receive input. Examples of input are tactile, audio, and video input. Examples of input devices 42 include a presence-sensitive screen, touch-sensitive screen, mouse, keyboard, voice responsive system, video camera, microphone or any other type of device for detecting input from a human or machine. In some examples, input devices 64 may include a presence-sensitive input device, such as a presence-sensitive screen, a touch-sensitive screen, or a trackpad, to name only a few examples.

One or more output devices 46 of computing device 21 may generate output. Examples of output are tactile, audio, and video output. Examples of output devices 46 include a presence-sensitive screen, sound card, video graphics adapter card, speaker, cathode ray tube (CRT) monitor, liquid crystal display (LCD), or any other type of device for generating output to a human or machine. Output devices 46 may include display devices such as cathode ray tube (CRT) monitor, liquid crystal display (LCD), or any other type of device for generating tactile, audio, and/or visual output.

One or more communication units 44 of computing device 21 may communicate with external devices via one or more networks by transmitting and/or receiving network signals on the one or more networks. For example, computing device 21 may use communication unit 44 to transmit and/or receive radio signals on a radio network such as a cellular radio network. Likewise, communication units 44 may transmit and/or receive satellite signals on a satellite network such as a global positioning system (GPS) network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless Ethernet network radios, as well as universal serial bus (USB) controllers. Communication units 44 may comprise one example of communication units 14 of computing device 10 and/or communication units 37 of computing device 11.

In some examples, UID 71 of computing device 21 may include functionality of input devices 42 and/or output devices 46. UID 71 may comprise one example of UID 12 of computing device 10. In the example of FIG. 2, UID 71 may be or may include a presence-sensitive screen. In some examples, a presence-sensitive screen may detect an object at and/or near the presence-sensitive screen. As one example range, a presence-sensitive screen may detect an object, such as a finger or stylus that is within two inches or less of the presence-sensitive screen. The presence-sensitive screen may determine a location (e.g., an (x,y) coordinate) of the presence-sensitive screen at which the object was detected. In another example range, a presence-sensitive screen may detect an object six inches or less from the presence-sensitive screen and other ranges are also possible. The presence-sensitive screen may determine the location of the screen selected by a user's finger using capacitive, inductive, and/or optical recognition techniques. In some examples, presence sensitive screen provides output to a user using tactile, audio, or video stimuli as described with respect to output devices 46.

In some examples, UID 71 may also provide output to a user using tactile, audio, or video stimuli as described with respect to output devices 46. For instance, UID 71 may include display device 72 that presents a graphical user interface. Display device 72 may be any type of output device that provides visual output, such as described with respect to output devices 46. While illustrated as an integrated component of computing device 21, UID 71 may, in some examples, be an external component that shares a data path with other components of computing device 21 for transmitting and/or receiving input and output. For instance, UID 71 may be a built-in component of computing device 21 located within and physically connected to the external packaging of computing device 21 (e.g., a screen on a mobile phone). In another example, UID 71 may be an external component of computing device 21 located outside and physically separated from the packaging of computing device 21 (e.g., a monitor or a projector that shares a wired and/or wireless data path with a tablet computer). In some examples, UID 71, when located outside of and physically separated from the packaging of computing device 21, may collectively refer to two components: a presence-sensitive input device 74 for receiving input and a display device 72 for providing output.

One or more storage devices 48 within computing device 21 may store information for processing during operation of computing device 21 (e.g., computing device 21 may store data accessed by one or more applications 68 during execution at computing device 21). In some examples, storage device 48 is a temporary memory, meaning that a primary purpose of storage device 48 is not long-term storage. Storage devices 48 on computing device 21 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI module 66, notification service module 64, applications 68, gesture module 62, operating system 52, image processing module 54, prioritization module 60, and/or image repository 58.

As shown in FIG. 2, computing device 21 may include a power source 70. In some examples, power source 70 may be a battery. Power source 70 may provide power to one or more components of computing device 2. Examples of power source 70 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 70 may have a limited capacity (e.g., 1000-3000 mAh).

One or more processors 40 may implement functionality and/or execute instructions within computing device 21. For example, processors 40 on computing device 21 may receive and execute instructions stored by storage devices 48 that execute the functionality of UI module 66, notification service module 64, applications 68, gesture module 62, operating system 52, image processing module 54, overlay module 56, and prioritization module 60. These instructions executed by processors 40 may cause computing device 21 to store information within storage devices 48 during program execution. Processors 40 may execute instructions of operating system 52 and applications 68 to perform one or more operations. That is, operating system 52 and applications 68 may be operable by processors 40 to perform various functions described herein.

In accordance with aspects of this disclosure, one or more of applications 68 may receive an incoming communication from an external device. (Applications 68 may comprise one example of applications 24 of computing device 10 and/or applications 39 of computing device 11.) For example, if application 68A is an email or a messaging application, application 68A may receive the incoming communication from an external device. (In other examples, the incoming communication may comprise various other forms of communications depending on the application. For instance, the incoming communication may also comprise a social media communication, a calendar reminder, a travel-related communication, a game-related communication, a stock-related communication, or a weather-related communication.)

Communication units 44 may receive the incoming communication and provide the communication to application 68A via communication channels 50. To notify a user of the receipt of the incoming communication, application 68A may generate and send a notification to notification service module 64. This notification may include notification content associated with the incoming communication. For example, the notification content may include message content and/or an image that are associated with the incoming communication, where the image is associated with a human user who has been determined to be an originator of the incoming communication.

As described in the example of FIG. 1B, in some instances, in addition to processing notifications internally, notification service module 64 may also send notifications to an external device for processing (e.g., via communication units 44). For example, if application 68A generated and sent a notification to notification service module 64 based on an incoming communication, notification service module 64 may send the notification to a notification service module of an external computing device for processing, similar to that described in reference to FIG. 1B. This notification may have notification content that includes message content associated with the incoming communication, as well as an image.

However, in various examples, computing device 21 may also further process the notifications. In some cases, the notification content may include references or links to the message content and/or the image, such that notification service module 64 may obtain the message content and/or the image from another source (e.g., a source local to computing device 21, a source external to computing device 21). For example, in some instances, computing device 21 may store images and other related information (e.g., location information, as described later) in image repository 58. Image repository 58 may include one or more images that have been previously stored by computing device 21. For example, the images stored in image repository 58 may include images that correspond to contacts of a user of computing device 21 (e.g., for email applications, messaging applications). If one or more of applications 68 have previously received and/or processed such images, these images may be stored in image repository 58 for later use.

In one non-limiting scenario, application 68A may have previously received an indication of an incoming communication originated from a user named "John Jones," and may have additionally received an image associated with "John Jones." Application 68A may have stored this image in image repository 58. If application 68A later receives another incoming communication determined to be originated by the user "John Jones," application 68A may access the previously stored image associated with "John Jones," even if the new incoming communication does not include (or does not reference) any image. Application 68A may determine the originator as "John Jones" based on other information included with the communication (e.g., header, "from" address, name).

Image repository 58 may also include other information associated with images. In some examples, image repository 58 may include location information for any individual image. For instance, for a given image that is stored in image repository 58, location information may also be stored in image repository 58 that associates each of a plurality of facial features with a corresponding region at which the respective facial feature is represented in the image.

Notification service module 64 may identify first and second portions of the image that are associated with respective first and second portions of the face of a human user. (Notification service module 64 may comprise one example of notification service module 22 of computing device 10 and/or notification service module 38 of computing device 11.) In some cases, notification service module 64 may interact with image processing module 54 to identify the first and second portions of the image. For instance, image processing module 54 may perform image recognition on the image to identify the first and second portions of the image. Image processing module 54 may implement one or more facial recognition algorithms to perform the identification process. In some cases, however, image processing module 54 and/or notification service module 64 may provide the image to a device that is external to computing device 21, where the external device performs facial recognition on the image and provides information identifying the first and second portions of the image back to image processing module and/or notification service module 64, where the first and second portions of the image are associated with respective first and second portions of the face of the user.

As noted above, however, image repository 58 may include location information for any individual image. The location information may associate each of a plurality of facial features with a corresponding region at which the respective facial feature is represented in an image. In these examples, notification service module 64 or an external device may have previously performed image/facial recognition on the image, and notification service module 64 may have stored corresponding location information in a local repository. By utilizing the previously stored location information, notification service module 64 avoids the image/facial recognition process for previously identified images.

In these examples, notification service module 64 is capable of identifying the first portion of the image, which is associated with the first portion of the face of the user, based at least in part on the location information. The first portion of the face includes a first group of one or more of the facial features. Notification service module 64 is also capable of identifying the second portion of the image, which is associated with the second portion of the face, based at least in part on the location information. The second portion of the face includes a second group of one or more of the facial features, the second group being different than the first group.

In still other examples, rather than utilizing any image/facial recognition processes, notification service module 64 may instead split the image into distinct portions based, e.g., on image size. For instance, notification service module 64 may split the image into top and bottom portions of pre-defined sizes (e.g., equal sizes), where it is assumed that the top portion of the image is likely associated with a portion of the face that includes distinctive facial features, such as both eyes, and the bottom portion is likely associated with a portion of the face that includes remaining features such as the nose and mouth.

Notification service module 64 provides notification content associated with the incoming communication to UI module 66, which includes the image, or a reference to the image (e.g., if the image is stored in image repository 58 of computing device 21), as well as an identification of the first and second portions of the image. (UI module 66 may comprise one example of UI module 20 of computing device 10.) The notification content further includes at least a portion of the message content associated with the incoming communication.

In many instances, it may be helpful to output the image contemporaneously with at least a portion of the message content, such that a viewer (e.g., the user of computing device 21) may be able to more quickly identify the originator. However, based on certain limitations that may exist with respect to a size of UID 71 (e.g., size of a presence-sensitive screen), it may be difficult to output the entire image along with the message content at the same time.

Thus, in one or more examples, notification service module 64 and/or UI module 66 may output the first and second portions of the image for display at UID 71. Additionally, notification service module 64 and/or UI module 66 may output the message content such that it at least partially overlays the second portion of the image. As a result, both first portion 34 of image 32 and message content 36 are viewable by the user of computing device 21 at substantially the same time. In addition, because first portion 34 includes one or more features of the face of the originator of the incoming communication (e.g., both eyes), the viewer may potentially be able to quickly identify the originator.

Storage devices 48 also include prioritization module 60. Prioritization module 60 may adjust or otherwise determine an amount of notification content that is to be output for display based on an importance or priority of the content. For example, if prioritization module 60 determines that first notification content associated with a first notification has a higher importance or priority than second notification content associated with a second notification, prioritization module 60 may output both the first and second notification content, but may output a larger amount of the first notification content as compared to the second notification content. As a result, the user of computing device 21 may be able to visually identify that the first notification content has higher importance or priority, and may be able to view a larger quantity of content associated with the first notification.

For example, after having processed a first incoming communication associated with first message content, as described above, one of applications 68 may receive a second incoming communication that is associated with second message content. Notification service module 64 and/or UI module 66 may output, for display, the second message content, where the second message content at least partially overlays the second portion of the digital image. Prioritization module 60 may determine, based at least in part on a priority associated with the first message content, an amount of the first message content to output for display. Prioritization module 60 may also determine, based at least in part on a priority associated with the second message content, an amount of the second message content to output for display. As a result, the user of computing device 21 may be able to visually identify an importance and/or priority of the first and second communications based on the amount of respective message content that is output for display.

The user of computing device 21 may also provide input at UID 71. Gesture module 62 may receive information about the input from UID 71 and determine one or more touch events based on the input. For example, gesture module 62 of computing device 21 may receive from UID 71 one or more indications of input detected by UID 71. Generally, each time UID 71 receives an indication of input, gesture module 62 may receive information about the input from UID 71. Gesture module 62 may assemble the information received from UID 71 into a time-ordered sequence of touch events. Each touch event in the sequence may include data or components that represents parameters (e.g., when, where, originating direction) characterizing a presence and/or movement of input at the presence-sensitive screen. Each touch event in the sequence may include a location component corresponding to a location of UID 71, a time component associated with when UID 71 detected input at the location, and an action component associated with the touch event.

Gesture module 62 may determine one or more characteristics of the input based on the sequence of touch events and include information about these one or more characteristics within each touch event in the sequence of touch events. For example, gesture module 62 may determine a start location of the input, an end location of the input, a density of a portion of the input, a speed of a portion of the input, a direction of a portion of the input, and a curvature of a portion of the input. One or more touch events in the sequence of touch events may include (in addition to a time, a location, and an action component as described above) a characteristic component that includes information about one or more characteristics of the input (e.g., a density, a speed). Gesture module 24 may transmit over communication channels 50, as output to UI module 66, the sequence of touch events including the components or parameterized data associated with each touch event.

Notification service module 64 and/or UI module 66 may receive the one or more touch events from UI module 66 and determine, based on the time and location components of the one or more touch events, that the input represents a particular indication from the user. Notification service module 64 and/or UI module 66 may then propagate the event or related information to a corresponding application (e.g., application 68A), which may then process the event or related information and perform additional operations based thereon.

Figure 3:
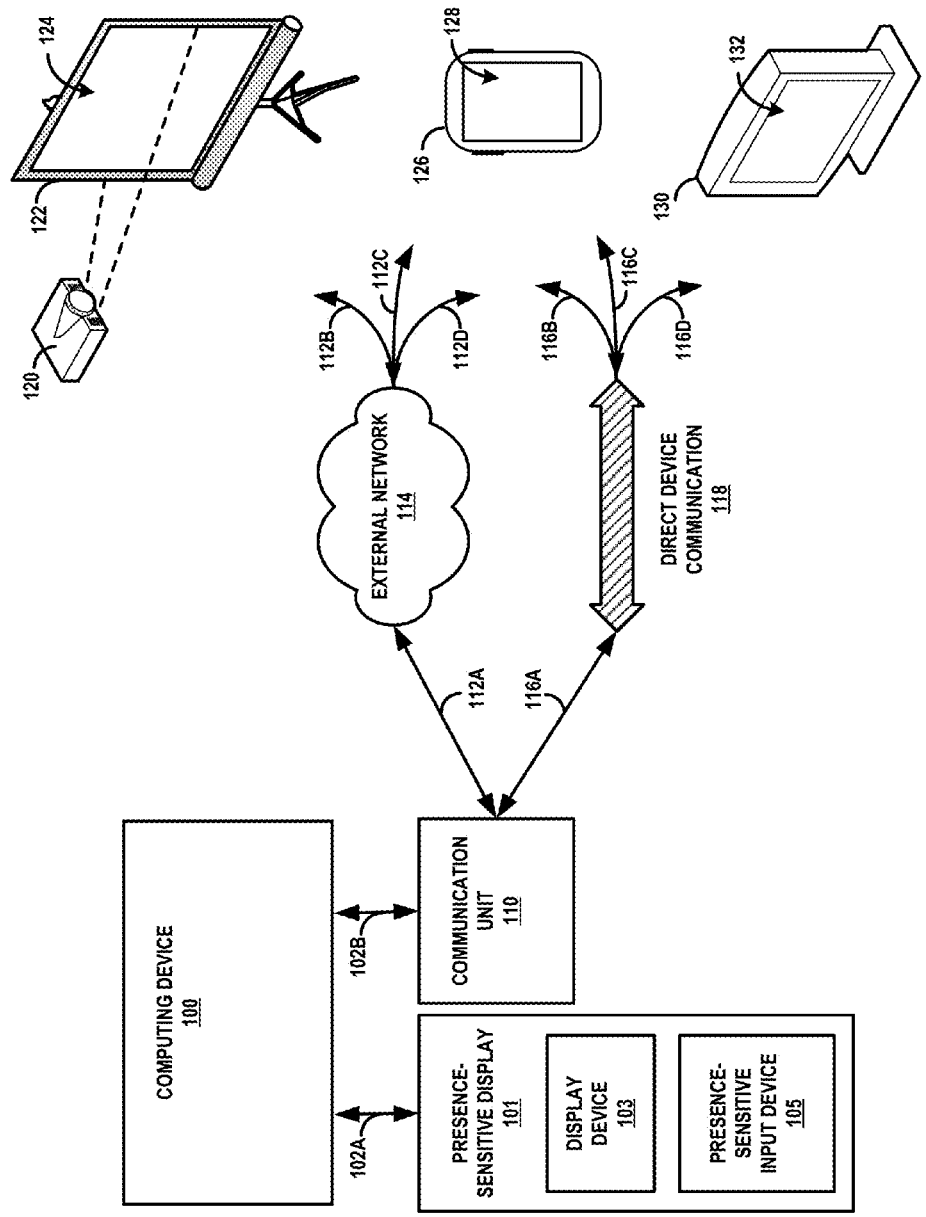
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, and/or a group of moving images. The example shown in FIG. 3 includes a computing device 100, presence-sensitive display 101, communication unit 110, projector 120, projector screen 122, mobile device 126, and visual display device 130. In some examples, computing device 100 may be one example of computing device 10, 11, and/or 21. Although shown for purposes of example in FIGS. 1 and 2 as stand-alone computing devices 10, 11, and 21, a computing device such as computing devices 10, 11, 21 and/or 100 may, generally, be any component or system that includes one or more processors or other suitable computing environment for executing software instructions and, for example, need not include a presence-sensitive display.

As shown in the example of FIG. 3, computing device 100 may be one or more processors that include functionality as described with respect to processors 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing devices 10, 11, and/or 21 in FIGS. 1A-1B and FIG. 2, a computing device may refer to a portable or mobile device such as a mobile phone (including a smart phone), a laptop computer, or a wearable device (e.g., watch). In some examples, a computing device may be a desktop computer, a tablet computer, a smart television platform, a camera, a personal digital assistant (PDA), a server, or a mainframe.

Presence-sensitive display 101 may include display device 103 and presence-sensitive input device 105. Display device 103 may, for example, receive data from computing device 100 and display the graphical content. In some examples, presence-sensitive input device 105 may determine one or more inputs (e.g., continuous gestures, multi-touch gestures, single-touch gestures) at presence-sensitive display 101 using capacitive, inductive, and/or optical recognition techniques and send indications of such input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 3, computing device 100 may also include and/or be operatively coupled with communication unit 110. Communication unit 110 may include functionality of communication units 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 100 may also include and/or be operatively coupled with one or more other devices (e.g., input devices, output devices, memory, storage devices) that are not shown in FIG. 3 for purposes of brevity and illustration.

FIG. 3 also illustrates a projector 120 and projector screen 122. Other such examples of projection devices may include electronic whiteboards, holographic display devices, and any other suitable devices for displaying graphical content. Projector 120 and projector screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more inputs (e.g., continuous gestures, multi-touch gestures, single-touch gestures) at projector screen 122 using optical recognition or other suitable techniques and send indications of such input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UID 71 as described in this disclosure. In some examples, presence-sensitive display 124 may include additional functionality. Projector screen 122 (e.g., an electronic whiteboard) may receive data from computing device 100 and display the graphical content. In some examples, presence-sensitive display 124 may determine one or more inputs (e.g., continuous gestures, multi-touch gestures, single-touch gestures) at projector screen 122 using capacitive, inductive, and/or optical recognition techniques and send indications of such input using one or more communication units to computing device 100.

FIG. 3 also illustrates mobile device 126 and visual display device 130. Mobile device 126 and visual display device 130 may each include computing and connectivity capabilities. Examples of mobile device 126 may include e-reader devices, convertible notebook devices, wearable devices (e.g., watches), and hybrid slate devices. Examples of visual display device 130 may include other semi-stationary devices such as televisions and computer monitors. As shown in FIG. 3, mobile device 126 may include a presence-sensitive display 128. Visual display device 130 may include a presence-sensitive display 132. Presence-sensitive displays 128, 132 may include a subset of functionality or all of the functionality of UID 71 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more inputs (e.g., continuous gestures, multi-touch gestures, single-touch gestures) at projector screen using capacitive, inductive, and/or optical recognition techniques and send indications of such input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, mobile device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM (asynchronous transfer mode), or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. One or more of the remote devices illustrated in FIG. 3 may be operatively coupled with computing device 100 by communication links 116A-116D. The various connections and communication links shown in FIG. 3 may be wireless and/or wired connections or links.

Figure 4:
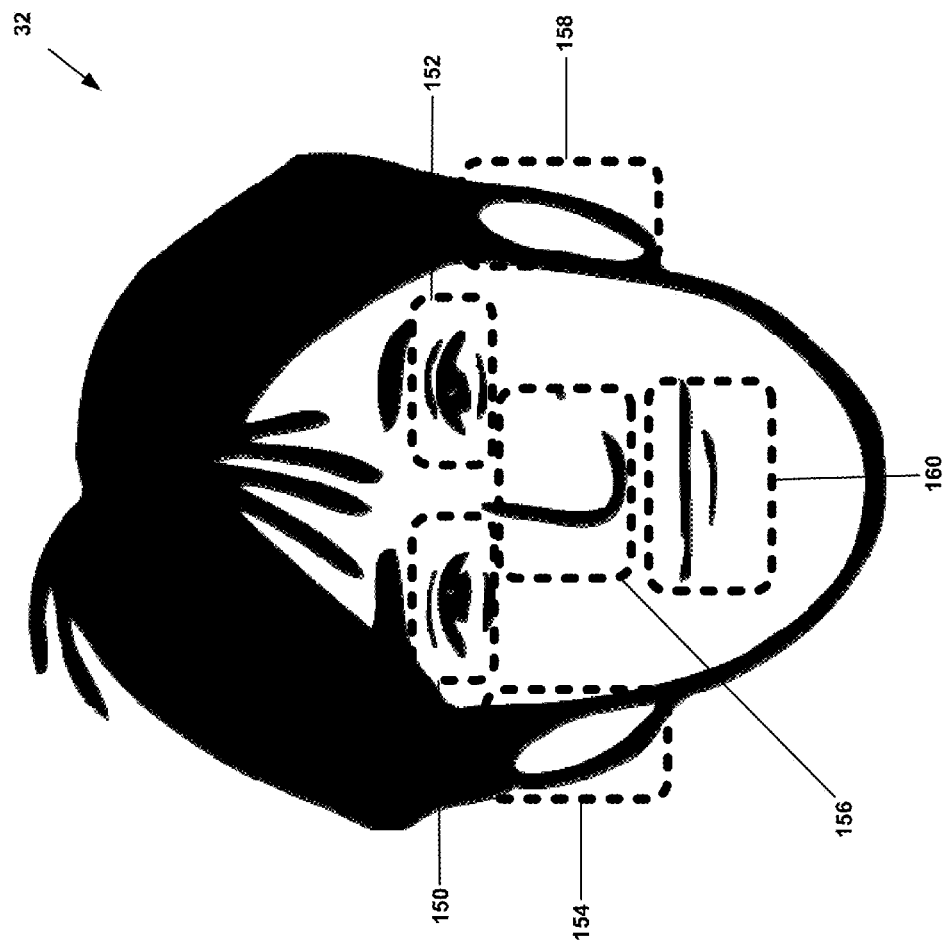
FIG. 4 is a conceptual diagram illustrating different regions of an image that correspond to different facial features of a human user, in accordance with one or more aspects of the present disclosure.
Figure 5:
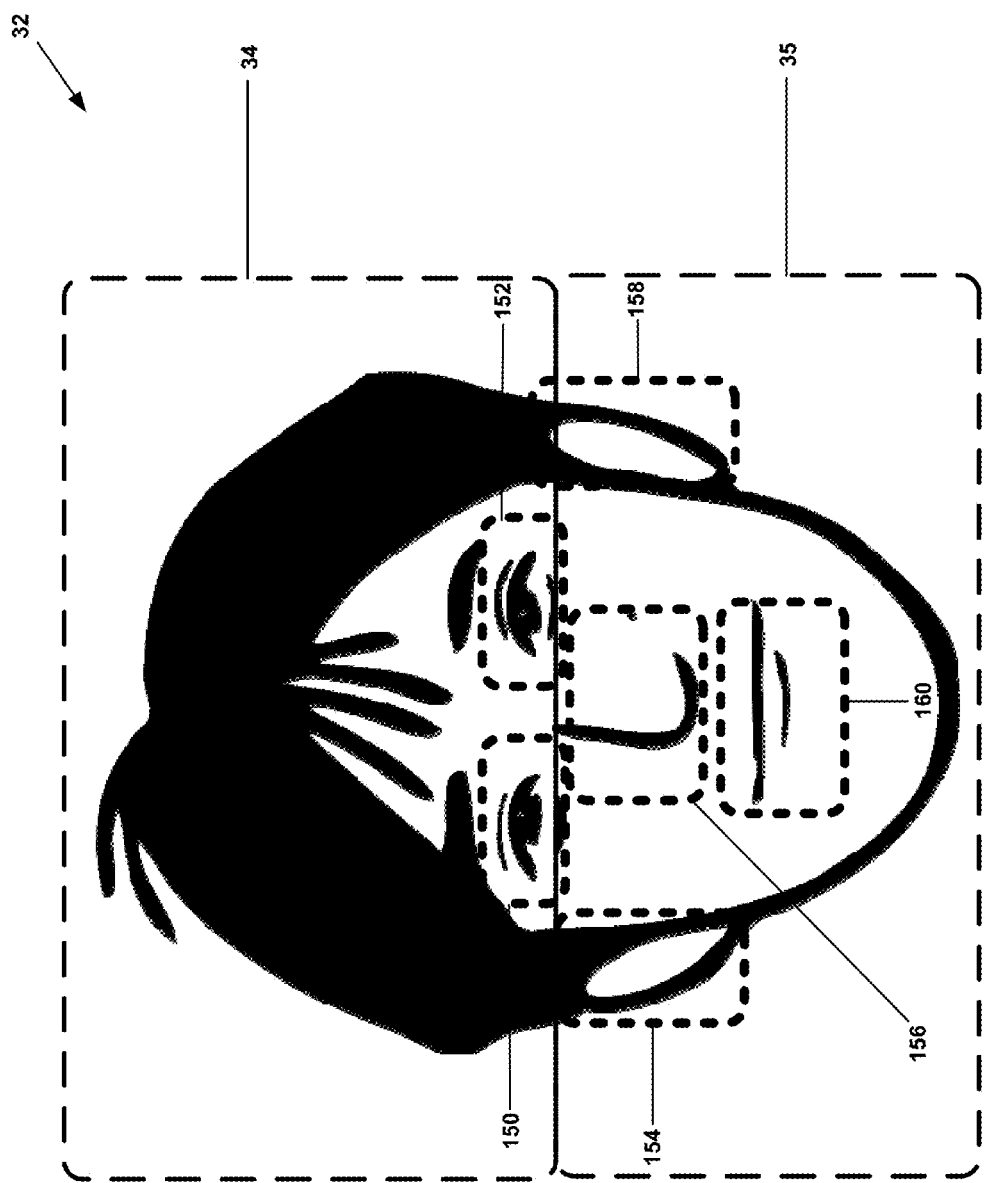
FIG. 5 is a conceptual diagram illustrating a first example identification of first and second portions of an image, in accordance with one or more aspects of the present disclosure.

FIG. 4 is a conceptual diagram illustrating different regions of an image that correspond to different facial features of a human user, in accordance with one or more aspects of the present disclosure. As described previously, notification service module 64 and/or UI module 66 of computing device 21 (FIG. 2) may identify first and second portions of an image, such as image 32, which are associated with respective first and second portions of a face of the human user. In some examples, notification service module 64 and/or UI module 66 may identify these first and second portions of image 32, as shown in FIG. 5, based on location information for various different facial features, where the location information associates each of the facial features with a corresponding region at which the respective facial feature is represented in image 32. In some instances, the location information may be stored in image repository 58, which may also store image 32.

As shown in FIG. 4, regions 150 and 152 of image 32 correspond with the respective facial features of a right eye and a left eye of the user. Regions 154 and 158 of image 32 correspond with the respective facial features of a right ear and a left ear of the user. Region 156 of image 32 corresponds with the facial feature of a nose of the user, and region 160 corresponds with the facial feature of a mouth of the user. Notification service module 64 may process the location information that associates each of these facial features with the corresponding region in image 32.

As described previously, in some cases, image processing module 54 may perform image recognition on image 32 in order to identify first and second portions of image 32. Using this process, image recognition module 54 may obtain the location information that associates each of the facial features with the corresponding region (e.g., region 150, 152, 154, 156, 158, 160) and provide this information to notification service module 64. Image processing module 54 may implement any known method of facial recognition to identify these portions of the face in image 32 and to obtain the corresponding location information. In certain examples, however, a device external to computing device 21 may perform the image/facial recognition on image 32 and provide the location information and/or an identification of first and second portions of image 32 to image processing module 54. In these examples, image processing module 54 may provide the external device with image 32 or a reference to image 32. Image processing module 54 is capable of providing the location information and/or identification of the first and second portions to notification service module 64.

In other cases, however, notification service module 64 may already have access to the location information. In these cases, image processing module 54 or an external device may have previously performed image/facial recognition on image 32, and image processing module 54 and/or notification service module 22 may have stored the corresponding location information in image repository 58.

As noted above, the location information associates each of the facial features with a corresponding region at which the respective facial feature is represented in image 32. Thus, in the example of FIG. 4, the location information may associate the user's right eye with region 150, the user's left eye with region 152, the user's nose with region 156, the user's right ear with region 154, the user's left ear with region 158, and the user's mouth with region 160. In some examples, the location information may provide spatial coordinates (e.g., x-y coordinates) to define each of regions 150, 152, 154, 156, 158, and 160 within image 32.

Figure 6:
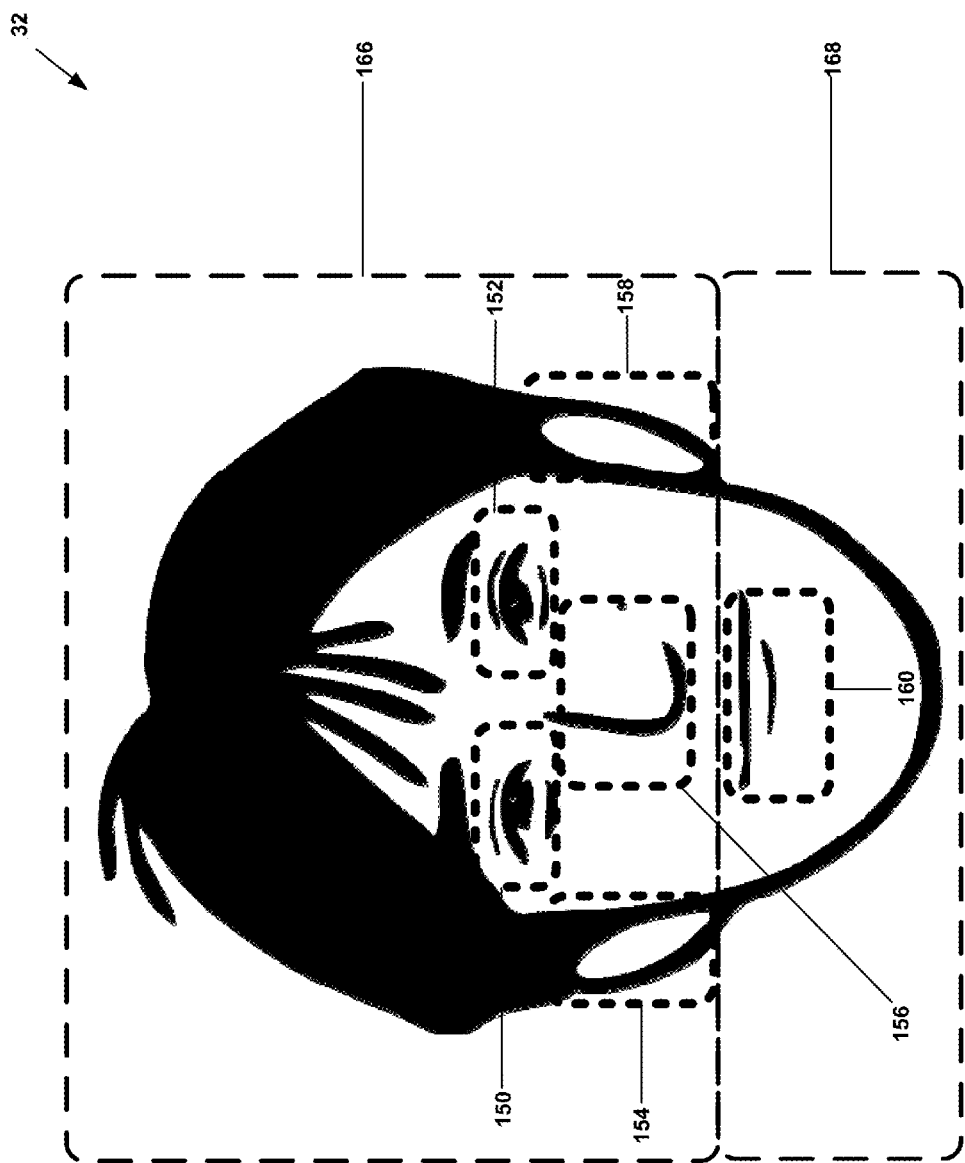
FIG. 6 is a conceptual diagram illustrating a second example identification of first and second portions of an image, in accordance with one or more aspects of the present disclosure.

Upon receiving the location information (e.g., from image processing module 54, from image repository 58), notification service module 64 may identify, based at least in part on the location information, a first portion (e.g., first portion 34 shown in FIGS. 1A and 1B) of image 32 that is associated with a first portion of the face of the user. The first portion of the face includes a first group of one or more of the facial features. Notification service module 22 may further identify, based at least in part on the location information, a second portion of image 32 (e.g., second portion 35 shown in FIGS. 1A and 1B) that is associated with a second portion of the face of the user. The second portion of the face includes a second group of one or more of the facial features. FIGS. 5 and 6 provide two examples of such identification.

FIG. 5 is a conceptual diagram illustrating a first example identification of first and second portions of image 32, in accordance with one or more aspects of the present disclosure. As shown in the example of FIG. 5, notification service module 64 may identify first portion 34 (e.g., the top portion, also shown in FIGS. 1A and 1B) and second portion 35 (e.g., bottom portion, also shown in FIGS. 1A and 1B) of image 32 based at least in part on the location information described above in reference to FIG. 4. First portion 34 and second portion 35 are indicated in FIG. 5 by the dotted boxes.

First portion 34 is associated with a first portion of the user's face, which may include the user's right and left eyes. As a result, first portion 34 includes regions 150 and 152 of image 32. Second portion 35 is associated with a second portion of the user's face, which may include the user's right and left ears, the user's nose, and the user's mouth. As a result, second portion 35 includes regions 154, 156, 158, and 160 of image 32.

Figure 7:
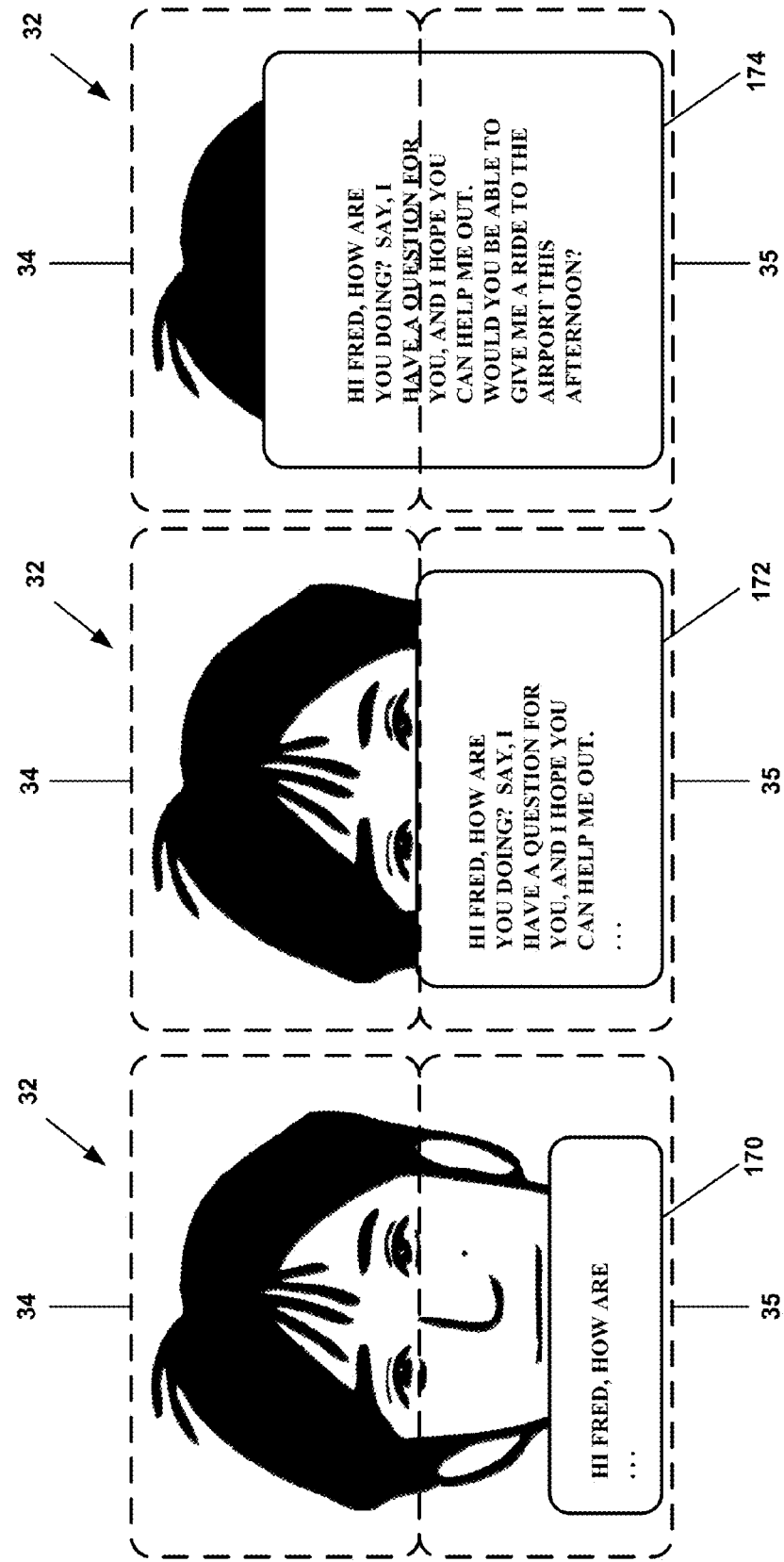
FIGS. 7A-7C are conceptual diagrams that illustrate examples of overlaying message content over at least a portion of an image, in accordance with one or more aspects of the present disclosure.

Upon receiving the location information, notification service module 64 may identify first portion 34 and second portion 35 based on one or more criteria or rules. For example, notification service module 64 may determine that first portion 34 will include at least regions 150 and 152 that are associated with the user's eyes based on a particular criterion or rule. This criterion or rule may be defined based on a premise that it would be potentially easier for a user of computing device 21 to identify the user represented in image 32 if at least the eyes are output for display in image 32. As shown in the examples of FIGS. 7A, 7B, and 7C, content associated with a notification or corresponding communication may be output to at least partially overlay second portion 35 of image 32, while leaving first portion 34 exposed for view (e.g., such that the content, as output for display, does not overlay first portion 34). In the example of FIG. 5, first portion 34 includes, at a minimum, regions 150 and 152 associated with the right and left eyes, respectively, but does not include regions 154, 156, 158, and 160.

FIG. 6 is a conceptual diagram illustrating a second example identification of first and second portions of image 32, in accordance with one or more aspects of the present disclosure. As shown in the alternative example of FIG. 6, notification service module 64 may identify first portion 166 and second portion 168 of image 32 based at least in part on the location information described above in reference to FIG. 4. First portion 166 and second portion 168 are indicated in FIG. 6 by the dotted boxes, and are different from first portion 34 and second portion 35 shown in FIG. 5.

In the example of FIG. 6, first portion 166 is associated with the user's right and left eyes, the user's right and left ears, and the user's nose. As a result, first portion 166 includes regions 150, 152, 154, 156, and 158 of image 32. Second portion 168 is associated with the user's mouth, and therefore second portion 168 includes only region 160 of image 32. Notification service module 64 may identify first portion 166 and second portion 168 based on one or more criteria or rules specifying that at least regions 150, 152, 154, 156, and 158 are included in first portion 166, which will be exposed for viewing and will not be covered or overlaid by content associated with a notification or corresponding communication, while second portion 168, which includes region 160, may be at least partially covered by the content associated with the notification or corresponding communication. These criteria or rule may be defined based on a premise that it would be potentially easier for a user of computing device 21 to identify the user represented in image 32 if the eyes and at least certain other distinguishing features, such as the user's ears and nose, are output for display in image 32. Content associated with a notification or corresponding communication may be output to at least partially overlay second portion 168 of image 32, while leaving first portion 166 exposed for view (e.g., such that the content does not overlay first portion 166). In the example of FIG. 6, first portion 166 includes, at a minimum, regions 150, 152, 154, 156, and 158 associated with the right and left eyes, the right ear, the nose, and the left ear, respectively, but does not include region 160.

Although first portion 166 and second portion 168 shown in FIG. 6, as well as first portion 34 and second portion 35 shown in FIG. 5, are shown as rectangle-shaped portions, each of these portions may have different shapes and sizes in other examples. For example, one or more of these portions may be a square-shaped portion, a circle-shaped portion, a triangle-shaped portion, or another polygon-shaped portion.

FIGS. 7A-7C are conceptual diagrams that illustrate examples of overlaying message content over at least a portion of image 32, in accordance with one or more aspects of the present disclosure. In FIGS. 7A-7C, it is assumed that notification service module 64 has identified first portion 34 and second portion 35 of image 32, as shown in the example of FIG. 5.

As shown in FIG. 7A, at a first point in time, notification service module 64 and/or UI module 66 may output a first portion of message content associated with an incoming communication. This first portion of the message content may be included within a graphical window 170, such that the first portion of the message content, as displayed, at least partially overlays second portion 35 of image 32. The first portion of the message content may provide at least initial text that is output for display to a user of computing device 21, and ellipses (i.e., "...") may be shown in graphical window 170 to indicate that there are one or more additional portions of the message content associated with the incoming communication.

At a second point in time, as shown in FIG. 7B, notification service module 64 and/or UI module 66 may output a second, additional portion of the message content, such that both the first and second portions of the message content, as displayed, at least partially overlay second portion 35 of image 32. In this particular example, the first portion of the message content may include the text "Hi Fred, how are," and the second portion of the message content includes the text "you doing? Say, I have a question for you, and I hope you can help me out." Both the first and second portions of the message content may be included in graphical window 172, which may again provide ellipses to indicate that there are one or more further portions of the message content that are associated with the incoming communication.

As is shown in the example of FIG. 7B, the top border of graphical window 72 is provided on the border between first portion 34 and second portion 35 of image 32, such that first portion 34 is exposed for view (e.g., such that message content does not overlay first portion 34). As a result, the first and second portions of the message content included in graphical window 72 are displayed under the two eyes of the user represented in image 32. The user of computing device 21 may be able to view these portions of the message content, along with first portion 34 of image 32, such that a viewer (e.g., the user of computing device 21) may more easily identify the human user represented by image 32 who is the originator of the incoming communication and associated message content.

In some instances, a transitional effect may be used when outputting the first and second portions of the message content, as shown in FIGS. 7A and 7B. For example, in some cases, notification module 64 and/or UI module 66 may output the first portion of the message content, as shown in FIG. 7A, and may subsequently transition to output both the first and second portions of the message content, as shown in FIG.

7B, upon receipt of user input (e.g., manual or verbal input received by UID 71 and/or input devices 42).

In other examples, notification service module 64 and/or UI module 66 may output the first portion of the message content in graphical window 170 for a defined period of time, as shown in FIG. 7A, and may then subsequently transition to output both the first and second portions of the message content in graphical window 172, as shown in FIG. 7B, where graphical window 172 is larger than graphical window 170. If the defined period of time is relatively short in length, a transitional effect may be provided wherein the user of computing device 21 may be initially presented with the first portion of the message content, first portion 34 of image 32, and one or more regions (e.g., regions 154, 156, 158, and 160 from FIG. 5) of second portion 35 of image 32 for the defined period of time. Shortly thereafter, the user of computing device 21 may be automatically presented with both the first and second portions of the message content in graphical window 172, as shown in FIG. 7B. This transitional effect may allow a viewer (e.g., the user of computing device 21) to view these portions of the message content over a period of time, and to more easily identify the human user represented by image 32 as the output transitions from that shown in FIG. 7A to FIG. 7B over this period of time.

Referring now to FIG. 7C, at a subsequent, third point in time, notification service module 64 and/or UI module 66 may output a third, additional portion of the message content, such that the first, second portions, and third portions of the message content, as displayed, at least partially overlay both first portion 34 and second portion 35 of image 32. In this particular example, the third portion of the message content may include the text "Would you be able to give me a ride to the airport this afternoon?" Each of the first, second, and third portions of the message content may be included in graphical window 174, which is larger in size than each of graphical windows 170 and 172. Although graphical window 174 at least partially overlays first portion 34, it includes additional message content for display to the user of computing device 21.

In some instances, notification service module 64 and/or UI module 66 may automatically transition between two or more of the outputs illustrated in FIGS. 7A, 7B, and/or 7C without user intervention. For example, as described above, the output illustrated in FIG. 7A may transition to the one illustrated in FIG. 7B after a first defined period of time. In addition, the output illustrated in FIG. 7B may transition to the one illustrated in FIG. 7C after a second defined period of time, where the second defined period of time may be the same, less than, or greater than the first defined period of time.

Alternatively, notification service module 64 and/or UI module 66 may transition between two or more of the outputs illustrated in FIGS. 7A, 7B, and/or 7C based upon receipt of user input (e.g., manual or verbal input received by UID 71 and/or input devices 42). For example, UID 71 and/or processors 40 may receive an indication of user input received at a region of presence-sensitive input device 74 (FIG. 2) that corresponds with one or more of first portion 34, second portion 35, or graphical windows 170/172/174 to initiate such a transition. The user of computing device 21, for instance, may initiate a tap or a swipe gesture at a region of presence-sensitive input device 74 that corresponds with graphical window 170 (e.g., a swipe-up gesture originating at a region of presence-sensitive input device 74 corresponding to a portion of graphical window 170) to cause notification service module 64 and/or UI module 66 to transition from the output illustrated in FIG. 7A to the one illustrated in FIG. 7B. Similarly, the user of computing device 21 may initiate a tap or a swipe gesture originating at a region of presence-sensitive input device 74 that corresponds with graphical window 172 to cause notification service module 64 and/or UI module 66 to transition from the output illustrated in FIG. 7B to the one illustrated in FIG. 7C.

Figure 8:
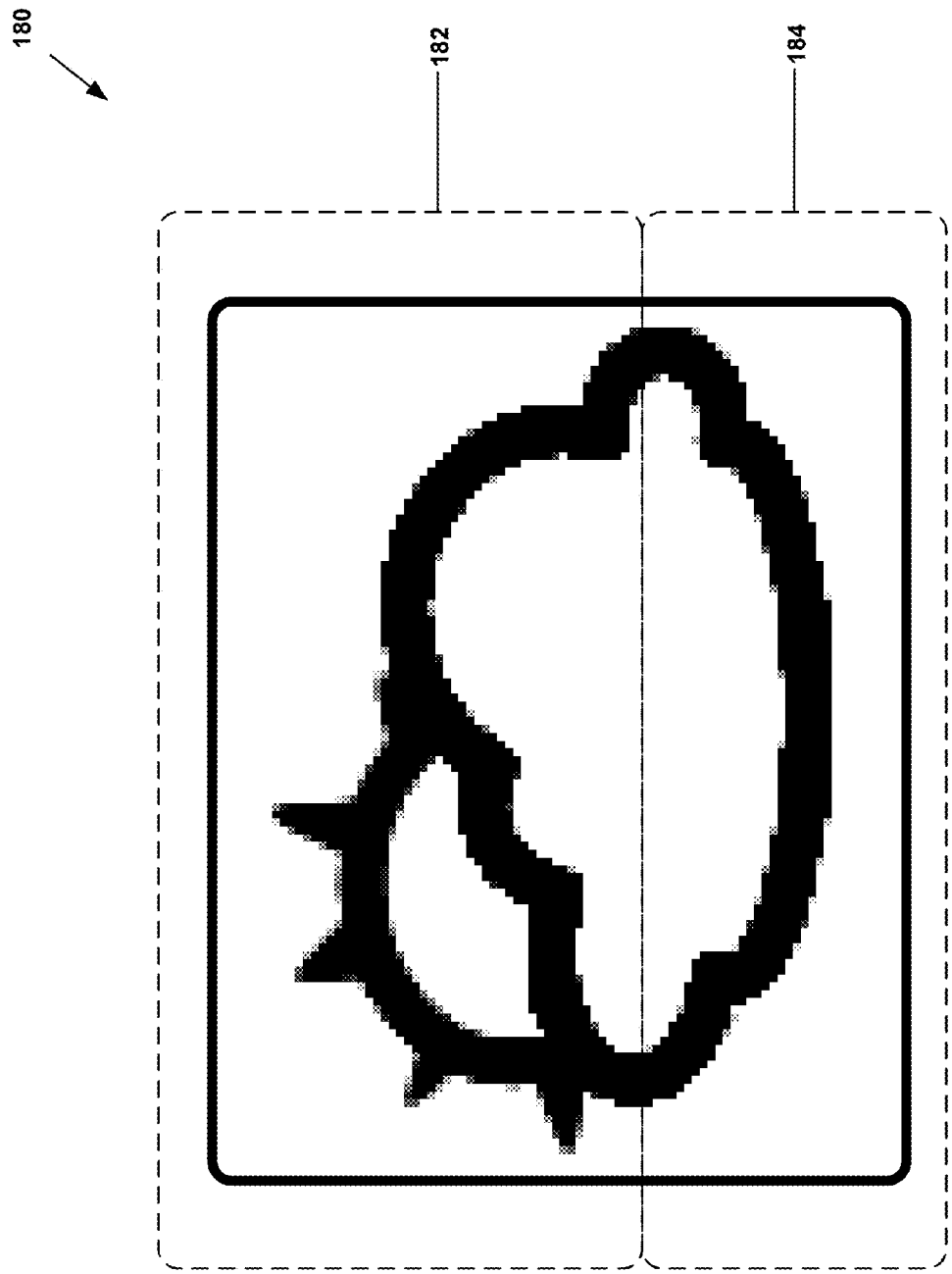
FIG. 8 is a conceptual diagram illustrating an example identification of first and second portions of a graphical element, in accordance with one or more aspects of the present disclosure.

FIG. 8 is a conceptual diagram illustrating an example identification of first and second portions of a graphical element 180, in accordance with one or more aspects of the present disclosure. In this particular example, notification service module 64 may receive a notification that is originated by one of applications 68, such as application 68A. Graphical element 180 may comprise a graphical representation of the application.

For instance, as shown in FIG. 8, graphical element 180 may comprise an icon that represents a weather application. In this instance, application 68A may comprise a weather application that generates weather-related notifications. Notification service module 64 may receive these notifications and output content that at least partially overlays graphical element 180, such that a user of computing device 21 may identify application 68A, a weather application, as an originator of the notification.

Notification service module 64 may identify and output first portion 182 (e.g., the top portion) and second portion 184 (e.g., bottom portion) of graphical element 180. First portion 182 and second portion 184 are indicated in FIG. 8 by the dotted boxes.

In some instances, notification service module 64 may identify first portion 182 and second portion 184 based on location information that associates each of a plurality of graphical features with a corresponding region at which the respective graphical feature is included in graphical element 180. For example, the location information may associate a graphical feature representing the sun (or at least a portion of the sun) with a first region of graphical element 180, and further associate a graphical feature representing a cloud (or at least a portion of a cloud) with a second region of graphical element 180. In the example of FIG. 8, a portion of the cloud may also be associated with the first region of graphical element 180.

Image processing module 54 may perform one or more image recognition algorithms to determine the location information. The location information may also be stored in image repository 58, such that image processing module 54 does not perform image recognition of graphical element 180 each time application 68A generates a weather-related notification.

Notification service module 64 may identify first portion 182 and second portion 184 based on the location information, such that first portion 182 is associated at least with a graphical feature representing at least a portion of the sun. As shown in FIG. 8, first portion 182 may also be associated with a graphical feature representing a top portion of a cloud. Second portion 184 may be associated with a graphical feature representing a bottom portion of the cloud. Notification service module 64 may identify first portion 182 and second portion 184 based on one or more criteria or rules. These criteria or rules may be defined based on a premise that it would be potentially easier for a user of computing device 21 to identify application 68A as the originator of a notification if at least a portion of the sun, as well as a portion of the cloud, are represented in first portion of the image. As shown in the examples of FIGS. 9A, 9B, and 9C, content associated with the notification may be output to at least partially overlay second portion 184 of graphical element 180, while leaving first portion 182 exposed for view (e.g., such that the content does not overlay first portion 182).

In other examples, notification service module 64 may identify first portion 182 such that it includes smaller or greater amounts of the graphical features of the sun and/or cloud shown in FIG. 8. In certain examples, rather than utilizing any image/facial recognition processes, notification service module 64 may instead split graphical element 180 into distinct portions based on size. For instance, notification service module 64 may split graphical element 180 into top and bottom portions of predefined sizes (e.g., equal sizes).

Although first portion 182 and second portion 184 of FIG. 8 are shown as rectangle-shaped portions, each of these portions may have different shapes and sizes in other examples. For example, one or more of these portions may be a square-shaped portion, a circle-shaped portion, a triangle-shaped portion, or another polygon-shaped portion.

Figure 9C:
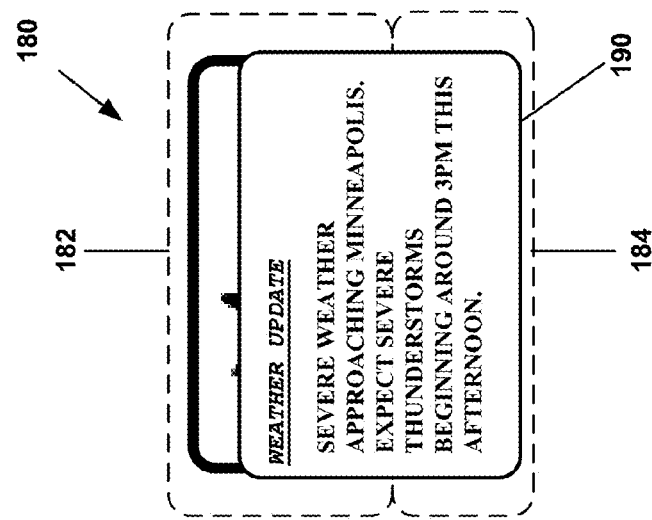
FIGS. 9A-9C are conceptual diagrams that illustrate examples of overlaying content over at least a portion of a graphical element, in accordance with one or more aspects of the present disclosure.
Figure 9B:
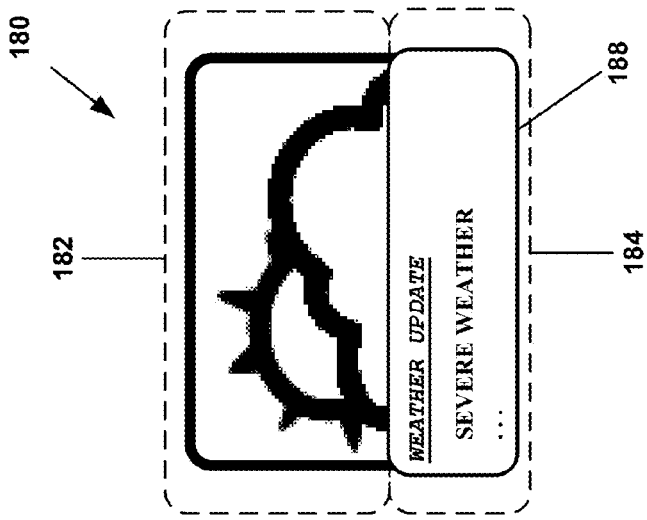
Figure 9A:
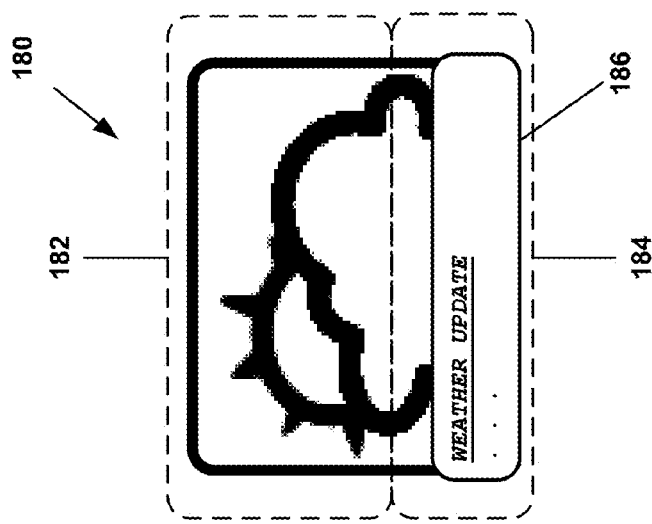

FIGS. 9A-9C are conceptual diagrams that illustrate examples of overlaying content over at least a portion of graphical element 180, in accordance with one or more aspects of the present disclosure. As shown in FIG. 9A, at a first point in time, notification service module 64 and/or UI module 66 may output a first portion of content associated with a weather-related notification. This first portion of the content may be included within a graphical window 186, such that the first portion of the content, as displayed, at least partially overlays second portion 184 of graphical element 180. The first portion of the content may provide at least initial text that is output for display to a user of computing device 21, and ellipses (i.e, " . . . ") may be shown in graphical window 186 to indicate that there are one or more additional portions of the content associated with the notification.

At a second point in time, as shown in FIG. 9B, notification service module 64 and/or UI module 66 may output a second, additional portion of the message content, such that both the first and second portions of the content, as displayed, at least partially overlay second portion 184 of graphical element 180. In this particular example, the first portion of the content may include the text "Weather Update" and the second portion of the content includes the text "Severe Weather." Both the first and second portions of the content may be included in graphical window 188, which may again provide ellipses to indicate that there are one or more further portions of the content that are associated with the notification. As is shown in FIG. 9B, the top border of graphical window 188 is provided on the border between first portion 182 and second portion 184 of graphical element 180, such that first portion 182 is exposed for view (e.g., such that content does not overlay first portion 182). The user of computing device 21 may be able to view these portions of the content, along with first portion 182 of graphical element 180, and potentially more easily identify the application (e.g., application 68A) represented by graphical element 180 that is the originator of the weather-related notification and associated content.

At a subsequent, third point in time, as shown in FIG. 9C, notification service module 64 and/or UI module 66 may output a third, additional portion of the message content, such that the first, second portions, and third portions of the message content, as displayed, at least partially overlay both first portion 182 and second portion 184 of graphical element 180. In this particular example, the third portion of the message content may include the text "approaching Minneapolis. Expect severe thunderstorms beginning around 3 pm this afternoon." Each of the first, second, and third portions of the content may be included in graphical window 190, which is larger in size than each of graphical windows 186 and 188. Although graphical window 190 at least partially overlays first portion 182, it includes additional message content for display to the user of computing device 21.

Similar to that described above in reference to FIGS. 7A-7C, in some instances, notification service module 64 and/or UI module 66 may automatically transition between two or more of the outputs illustrated in FIGS. 9A, 9B, and/or 9c without user intervention. For example, the output illustrated in FIG. 9A may transition to the one illustrated in FIG. 9B after a first defined period of time. In addition, the output illustrated in FIG. 9B may transition to the one illustrated in FIG. 9C after a second defined period of time, where the second defined period of time may be the same, less than, or greater than the first defined period of time.

Alternatively, notification service module 64 and/or UI module 66 may transition between two or more of the outputs illustrated in FIGS. 9A, 9B, and/or 9C based upon receipt of user input (e.g., manual or verbal input received by UID 71 and/or input devices 42), similar to that described above in reference to FIGS. 7A, 7B, and 7C.

FIGS. 10A and 10B are conceptual diagrams that illustrate an example of multiple instances of content that at least partially overlays a portion of a graphical element or image 200, in accordance with one or more aspects of the present disclosure. In FIGS. 10A and 10B, element 200 may comprise a graphical element or an image, and will be referred to below as element 200. As shown in FIGS. 10A and 10B, it is assumed that element 200 comprises a first (top) portion 201 and a second (bottom) portion 203. Dotted line 202 indicates the boundary, or edge, between first portion 201 and second portion 203 of element 200.

Over time, notification service module 64 may receive multiple notifications from one or more of applications 68, and various ones of these notifications may be generated by a given application, such as application 68A or an application executing on a device external to computing device 21. For instance, application 68A may generate these notifications during execution and may serve as a notification originator. In some instances, application 68A may generate notifications in response to receiving an incoming communication that is associated with message content (e.g., if application 68A is an email or messaging application), where a human user is an originator of the communication.

As one non-limiting example, notification service module 64 may receive a first notification ("NOTIFICATION #1") from application 68A corresponding to a first incoming communication (e.g., email), and may output, for display, first content that is associated with the first incoming communication. As shown in FIG. 10A, a first portion of the first content associated with the first incoming communication is included for display in graphical window 204. This first portion of the first content included in graphical window 204 at least partially overlays second portion 203 of element 200. Notification service module 64 may also receive a second notification ("NOTIFICATION #2") from application 68A corresponding to a second incoming communication, where the same entity (e.g., human user, application 68A) is an originator of both the first and second incoming communications or the corresponding first and second notifications. Notification service module 64 may output, for display in graphical window 206, a first portion of second content associated with the second incoming notification, such that the first portion of the second content included graphical window 206 also at least partially overlays second portion 203 of element 200.

Additionally, notification service module 64 may receive a third notification ("NOTIFICATION #3") from application 68A corresponding to a third incoming communication, where the same entity (e.g., human user, application 68A) is an originator of each of the first, second, and third incoming communications or the corresponding first, second, or third notifications. Notification service module 64 may output, for display in graphical window 208, a first portion of third content associated with the third incoming notification, such that the first portion of the third content in graphical window 208 also at least partially overlays second portion 203 of element 200.

The portions of content included in respective graphical windows 204, 206, and 208, however, may convey information of differing importance. In FIG. 10A, graphical windows 204, 206, and 208 may be substantially equal in size, and the amounts of the content displayed in these windows may be substantially the same. As a result, upon viewing graphical windows 204, 206, and 208 and the respective portions of content displayed therein, a user may not necessarily be able to discern a difference in a level of importance between the corresponding notifications.

Thus, in certain examples, notification service module 64 and/or UI module 66 may increase the size of a given graphical window (e.g., to display more of the window) if the window includes content of higher importance. The range of importance may be defined in a long a spectrum, such that the graphical window with potentially more important information (e.g., severe weather information, important stock information, urgent email information, travel flight information) may have a larger size and overlay a larger portion of second portion 203 of element 200. In such fashion, the sizes of the graphical windows may differ according to the level of importance/severity of the information or content contained therein. By increasing the size of graphical windows containing potentially more important notification content, the user of computing device 21 may be able to identify which of notification may be of higher importance.

As indicated in FIG. 10B, notification service module 64 and/or UI module 66 may determine, based at least in part on a priority associated with the second content associated with the second notification, an amount of the second content to output for display in graphical window 210, wherein graphical window 210 is larger than window 206. Notification service module 64 and/or UI module 66 may further determine, based at least in part on a priority associated with the third content associated with the third notification, an amount of the third content to output for display in window 208, and, based at least in part on a priority associated with the first content associated with the first notification, an amount of the first content to output for display in window 204.

In the particular example of FIG. 10B, notification service module 64 and/or UI module 66 have determined to increase the amount of overall amount of the second content to output for display in window 210 based upon the priority of such content for the second notification. For instance, the second notification may relate to an urgent email, while the first and third notifications may relate only to certain less important status information. Thus, as shown in FIG. 10B, graphical window 210 includes the first portion and also a second, additional portion of the second content. Similar to that shown in FIG. 10A, however, graphical window 204 in FIG. 10B includes only the first portion of the first content, and graphical window 208 includes only the first portion of the third content.

As a result, graphical window 210 is larger in size than each of graphical windows 204 and 208. Additionally, the amount of information included for display in graphical window 210 is more than the respective amounts of information included for display in graphical windows 204 and 208. By increasing the size of graphical window 210 in relation to graphical windows 204 and 208, based upon the higher priority of the second content associated with the second notification, and by outputting a larger amount of the second content to output for display in graphical window 210, the user of computing device 21 may be able to identify which of the three notifications may be of higher importance.

Notification service module 64 and/or UI module 66 may be preprogrammed to determine a priority level of a given notification or associated content. In other examples, notification service module 64 and/or UI module 66 may be configurable and allow inputs from a user to assign priority levels based on the notification's source (e.g., application and/or remote service of origin).

In some cases, notification service module 64 and/or UI module 66 may categorize notifications or associated content as either high priority or low priority by comparing the priority level to a priority threshold. For example, in response to determining that the priority level associated with a notification does not satisfy a priority threshold (e.g., the priority level is low), notification service module 64 and/or UI module 66 may determine that the notification is a low priority notification. Conversely, in response to determining that the priority level associated with the notification satisfies the priority threshold (e.g., the priority level is high), notification service module 64 and/or UI module 66 may determine that the notification represents a high priority notification. Notification service module 64 and/or UI module 66 may include less content in a graphical window associated with a low priority notification than in a graphical window associated with a high priority notification.

Figure 11:
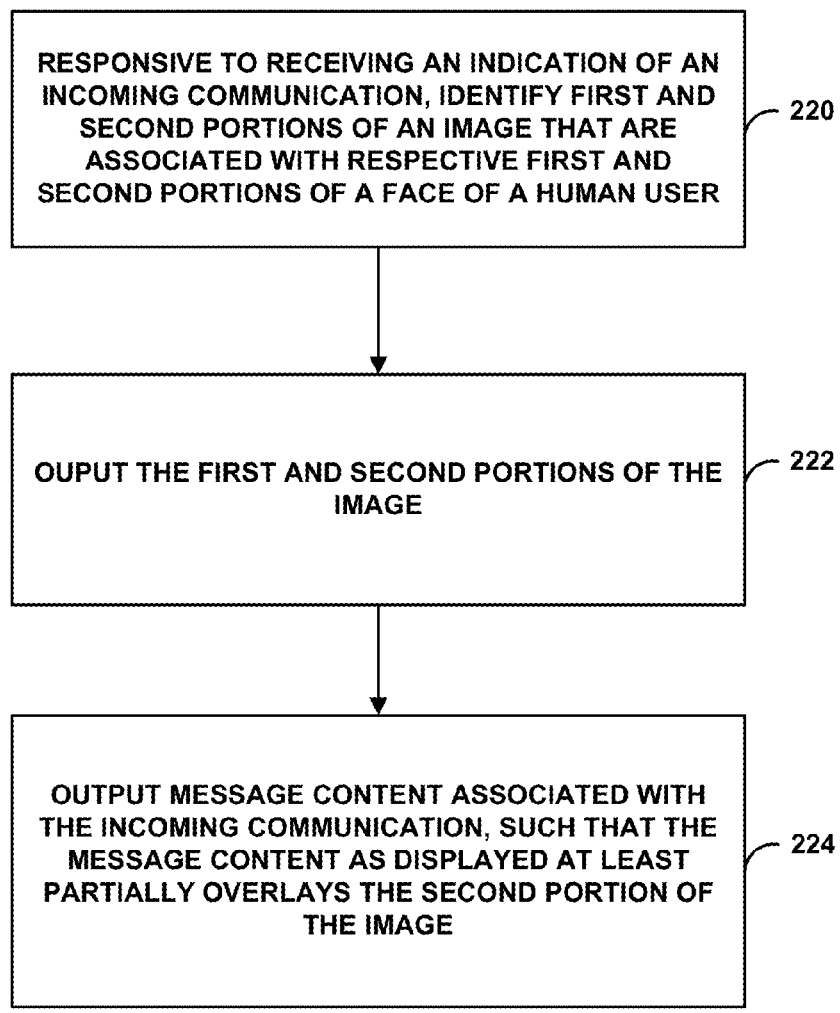
FIG. 11 is a flowchart illustrating example operations of a computing device, in accordance with one or more aspects of the present disclosure.

FIG. 11 is a flowchart illustrating example operations of a computing device, such as computing device 10, 11, and/or 21, in accordance with one or more aspects of the present disclosure. For purposes of illustration only, the operations of FIG. 11 are described with reference to computing device 21 shown in FIG. 2.

Responsive to computing device 21 receiving an indication of an incoming communication, notification service module 64 and/or UI module 66 identify first and second portions of an image that are associated with respective first and second portions of a face of a human user, wherein the human user has been determined to be an originator of the incoming communication (220). Notification service module 64 and/or UI module 66 may output, for display, the first and second portions of the image that are associated with the respective first and second portions of the face of the human user (222), and may also output, for display, message content associated with the incoming communication, such that the message content as displayed at least partially overlays the second portion of the image (224).

Example 1

A method comprising: responsive to receiving an indication of an incoming communication, identifying, by a computing device, first and second portions of an image that are associated with respective first and second portions of a face of a human user, wherein the human user has been determined to be an originator of the incoming communication; outputting, by the computing device and for display, the first and second portions of the image that are associated with the respective first and second portions of the face of the human user; and outputting, by the computing device and for display, message content associated with the incoming communication, such that the message content as displayed at least partially overlays the second portion of the image.

Example 2

The method of Example 1, wherein the message content, as displayed, does not overlay the first portion of the image.

Example 3

The method of any of Examples 1-2, wherein the incoming communication comprises one of an email, a message, a social media communication, a calendar reminder, a travel-related communication, a game-related communication, a stock-related communication, or a weather-related communication.

Example 4

The method of any of Examples 1-3, wherein the message content is output, for display, in a region that is adjacent to and beneath the first portion of the image.

Example 5

The method of any of Examples 1-4, wherein the first portion of the face of the human user includes both eyes of the human user, and wherein the second portion of the face of the human user includes a nose and a mouth of the human user.

Example 6

The method of any of Examples 1-5, wherein the message content, as displayed, at least partially exposes the second portion of the image for viewing by a user of the computing device.

Example 7

The method of any of Examples 1-6, wherein outputting the message content comprises: at a first point in time, outputting a first portion of the message content, such that the first portion of the message content as displayed at least partially overlays the second portion of the image; and at a second point in time, outputting a second portion of the message content, such that both the first and second portions of the message content as displayed at least partially overlay the second portion of the image.

Example 8

The method of Example 7, further comprising: at a third point in time, outputting a third portion of the message content, such that the first, second, and third portions of the message content as displayed at least partially overlay both the first and second portions of the image.

Example 9

The method of any of Examples 1-8, wherein identifying the first and second portions of the image comprises: receiving location information for a plurality of facial features of the face of the human user, wherein the location information associates each of the plurality of facial features with a corresponding region at which the respective facial feature is represented in the image; identifying, based at least in part on the location information, the first portion of the image that is associated with the first portion of the face of the human user, wherein the first portion of the face of the human user includes a first group of one or more of the plurality of facial features; and identifying, based at least in part on the location information, the second portion of the image that is associated with the second portion of the face of the human user, wherein the second portion of the face of the human user includes a second group of one or more of the plurality of facial features, the second group being different than the first group.

Example 10

The method of Example 9, wherein receiving the location information comprises: performing image recognition on the image to obtain the location information.

Example 11

The method of any of Examples 1-10, wherein the incoming communication comprises a first incoming communication, and wherein the message content comprises first message content, the method further comprising: receiving an indication of a second incoming communication that is associated with second message content, wherein the human user has been determined to be an originator of the second incoming communication; and outputting, for display, the second message content associated with the second incoming communication, wherein the second message content at least partially overlays the second portion of the digital image.

Example 12

The method of Example 11, wherein outputting the first message content comprises determining, based at least in part on a priority associated with the first message content, an amount of the first message content to output for display, and wherein outputting the second message content comprises determining, based at least in part on a priority associated with the second message content, an amount of the second message content to output for display.

Example 13

A method comprising: responsive to receiving a notification, identifying, by a computing device, first and second portions of a graphical element, wherein the graphical element represents an application that has been determined to be an originator of the notification; outputting, by the computing device and for display, the first and second portions of the graphical element; and outputting, by the computing device and for display, content associated with the notification, such that the content as displayed at least partially overlays the second portion of the graphical element.

Example 14

The method of Example 13, wherein the content, as displayed, does not overlay the first portion of the graphical element.

Example 15

The method of any of Examples 13-14, wherein outputting the content comprises: at a first point in time, outputting a first portion of the content, such that the first portion of the content as displayed at least partially overlays the second portion of the graphical element; at a second point in time, outputting a second portion of the content, such that both the first and second portions of the content as displayed at least partially overlay the second portion of the graphical element; and at a third point in time, outputting a third portion of the content, such that the first, second, and third portions of the content as displayed at least partially overlay both the first and second portions of the graphical element.

Example 16

The method of any of Examples 13-15, wherein the notification comprises a first notification, and wherein the content comprises first content, the method further comprising: receiving a second notification that is associated with second content, wherein the application has been determined to be an originator of the second notification; outputting, for display, the second content associated with the second notification, wherein the second content at least partially overlays the second portion of the graphical element, wherein outputting the first content comprises determining, based at least in part on a priority associated with the first content, an amount of the first content to output for display, and wherein outputting the second content comprises determining, based at least in part on a priority associated with the second content, an amount of the second content to output for display.

Example 17

A computer-readable storage medium encoded with instructions that, when executed, cause at least one processor to perform operations comprising: responsive to receiving an indication of an incoming communication, identifying first and second portions of an image that are associated with respective first and second portions of a face of a human user, wherein the human user has been determined to be an originator of the incoming communication; outputting, for display, the first and second portions of the image that are associated with the respective first and second portions of the face of the human user; and outputting, for display, message content associated with the incoming communication, such that the message content as displayed at least partially overlays the second portion of the image.

Example 18

The computer-readable storage medium of Example 17, wherein the message content, as displayed, does not overlay the first portion of the image.

Example 19

The computer-readable storage medium of any of Examples 17-18, wherein the message content, as displayed, at least partially exposes the second portion of the image for viewing by a user of the computing device.

Example 20

The computer-readable storage medium of any of Examples 17-19, wherein the instructions that, when executed, cause the at least one processor to output the message content comprise instructions that, when executed, cause the at least one processor to perform operations comprising: at a first point in time, outputting a first portion of the message content, such that the first portion of the message content as displayed at least partially overlays the second portion of the image; and at a second point in time, outputting a second portion of the message content, such that both the first and second portions of the message content as displayed at least partially overlay the second portion of the image.

Example 21

The computer-readable storage medium of Example 20, further encoded with instructions that, when executed, cause the at least one processor to perform operations comprising: at a third point in time, outputting a third portion of the message content, such that the first, second, and third portions of the message content as displayed at least partially overlay both the first and second portions of the image.

Example 22

The computer-readable storage medium of any of Examples 17-21, wherein the instructions that, when executed, cause the at least one processor to identify the first and second portions of the image comprise instructions that, when executed, cause the at least one processor perform operations comprising: receiving location information for a plurality of facial features of the face of the human user, wherein the location information associates each of the plurality of facial features with a corresponding region at which the respective facial feature is represented in the image; identifying, based at least in part on the location information, the first portion of the image that is associated with the first portion of the face of the human user, wherein the first portion of the face of the human user includes a first group of one or more of the plurality of facial features; and identifying, based at least in part on the location information, the second portion of the image that is associated with the second portion of the face of the human user, wherein the second portion of the face of the human user includes a second group of one or more of the plurality of facial features, the second group being different than the first group.

Example 23

The computer-readable storage medium of Example 22, wherein the instructions that, when executed, cause the at least one processor to receive the location information comprise instructions that, when executed, cause the at least one processor to perform image recognition on the image to obtain the location information.

Example 24

The computer-readable storage medium of any of Examples 17-23, wherein the incoming communication comprises a first incoming communication, and wherein the message content comprises first message content, the computer-readable storage medium being further encoded with instructions that, when executed, cause the at least one processor to perform operations comprising: receiving an indication of a second incoming communication that is associated with second message content, wherein the human user has been determined to be an originator of the second incoming communication; and outputting, for display, the second message content associated with the second incoming communication, wherein the second message content at least partially overlays the second portion of the digital image.

Example 25

The computer-readable storage medium of Example 24, wherein the instructions that, when executed, cause the at least one processor to output the first message content comprise instructions that, when executed, cause the at least one processor to determine, based at least in part on a priority associated with the first message content, an amount of the first message content to output for display, and wherein the instructions that, when executed, cause the at least one processor to output the second message content comprise instructions that, when executed, cause the at least one processor to determine, based at least in part on a priority associated with the second message content, an amount of the second message content to output for display.

Example 26

A computing device, comprising: at least one processor, wherein the at least one processor is configured to: responsive to receiving an indication of an incoming communication, identify first and second portions of an image that are associated with respective first and second portions of a face of a human user, wherein the human user has been determined to be an originator of the incoming communication; output, for display, the first and second portions of the image that are associated with the respective first and second portions of the face of the human user; and output, for display, message content associated with the incoming communication, such that the message content as displayed at least partially overlays the second portion of the image.

Example 27

The computing device of Example 26, wherein the message content, as displayed, does not overlay the first portion of the image.

Example 28

The computing device of any of Examples 26-27, wherein the message content, as displayed, at least partially exposes the second portion of the image for viewing by a user of the computing device.

Example 29

The computing device of any of Examples 26-28, wherein the at least one processor configured to output the message content is further configured to: at a first point in time, output a first portion of the message content, such that the first portion of the message content as displayed at least partially overlays the second portion of the image; and at a second point in time, output a second portion of the message content, such that both the first and second portions of the message content as displayed at least partially overlay the second portion of the image.

Example 30

The computing device of Example 29, wherein the at least one processor is further configured to: at a third point in time, output a third portion of the message content, such that the first, second, and third portions of the message content as displayed at least partially overlay both the first and second portions of the image.

Example 31

The computing device of any of Examples 26-30, wherein the at least one processor configured to identify the first and second portions of the image is further configured to: receive location information for a plurality of facial features of the face of the human user, wherein the location information associates each of the plurality of facial features with a corresponding region at which the respective facial feature is represented in the image; identify, based at least in part on the location information, the first portion of the image that is associated with the first portion of the face of the human user, wherein the first portion of the face of the human user includes a first group of one or more of the plurality of facial features; and identify, based at least in part on the location information, the second portion of the image that is associated with the second portion of the face of the human user, wherein the second portion of the face of the human user includes a second group of one or more of the plurality of facial features, the second group being different than the first group.

Example 32

The computing device of Example 31, wherein the at least one processor configured to receive the location information is further configured to perform image recognition on the image to obtain the location information.

Example 33

The computing device of any of Examples 26-32, wherein the incoming communication comprises a first incoming communication, wherein the message content comprises first message content, and wherein the at least one processor is further configured to: receive an indication of a second incoming communication that is associated with second message content, wherein the human user has been determined to be an originator of the second incoming communication; and output, for display, the second message content associated with the second incoming communication, wherein the second message content at least partially overlays the second portion of the digital image.

Example 34

The computing device of Example 33, wherein the at least one processor is further configured to: determine, based at least in part on a priority associated with the first message content, an amount of the first message content to output for display; and determine, based at least in part on a priority associated with the second message content, an amount of the second message content to output for display.

Example 35

A computer-readable storage medium encoded with instructions that, when executed, cause at least one processor to perform the method of any of Examples 1-16.

Example 36

A computing device comprising means for performing the method of any of Examples 1-16.

Example 37

A computer-readable storage medium encoded with instructions that, when executed, cause at least one processor to perform operations comprising: responsive to receiving a notification, identifying, by a computing device, first and second portions of a graphical element, wherein the graphical element represents an application that has been determined to be an originator of the notification; outputting, by the computing device and for display, the first and second portions of the graphical element; and outputting, by the computing device and for display, content associated with the notification, such that the content as displayed at least partially overlays the second portion of the graphical element.

Example 38

The computer-readable storage medium of Example 37, wherein the content, as displayed, does not overlay the first portion of the graphical element.

Example 39

The computer-readable storage medium of any of Examples 37-38, wherein the instructions that, when executed, cause the at least one processor to output the content comprise instructions that, when executed, cause the at least one processor to perform operations comprising: at a first point in time, outputting a first portion of the content, such that the first portion of the content as displayed at least partially overlays the second portion of the graphical element; at a second point in time, outputting a second portion of the content, such that both the first and second portions of the content as displayed at least partially overlay the second portion of the graphical element; and at a third point in time, outputting a third portion of the content, such that the first, second, and third portions of the content as displayed at least partially overlay both the first and second portions of the graphical element.

Example 40

The computer-readable storage medium of any of Examples 37-39, wherein the notification comprises a first notification, and wherein the content comprises first content, the computer-readable storage medium being further encoded with instructions that, when executed, cause the at least one processor to perform operations comprising: receiving a second notification that is associated with second content, wherein the application has been determined to be an originator of the second notification; and outputting, for display, the second content associated with the second notification, wherein the second content at least partially overlays the second portion of the graphical element, wherein outputting the first content comprises determining, based at least in part on a priority associated with the first content, an amount of the first content to output for display, and wherein outputting the second content comprises determining, based at least in part on a priority associated with the second content, an amount of the second content to output for display.

Example 41

A computing device comprising: at least one processor, wherein the at least one processor is configured to: responsive to receiving a notification, identify first and second portions of a graphical element, wherein the graphical element represents an application that has been determined to be an originator of the notification; output, for display, the first and second portions of the graphical element; and output, for display, content associated with the notification, such that the content as displayed at least partially overlays the second portion of the graphical element.

Example 42

The computing device of Example 41, wherein the content, as displayed, does not overlay the first portion of the graphical element.

Example 43

The computing device of any of Examples 41-42, wherein the at least one processor configured to output the content is further configured to: at a first point in time, output a first portion of the content, such that the first portion of the content as displayed at least partially overlays the second portion of the graphical element; at a second point in time, output a second portion of the content, such that both the first and second portions of the content as displayed at least partially overlay the second portion of the graphical element; and at a third point in time, output a third portion of the content, such that the first, second, and third portions of the content as displayed at least partially overlay both the first and second portions of the graphical element.

Example 44

The computing device of any of Examples 41-43, wherein the notification comprises a first notification, and wherein the content comprises first content, the at least one processor being further configured to: receive a second notification that is associated with second content, wherein the application has been determined to be an originator of the second notification; and output, for display, the second content associated with the second notification, wherein the second content at least partially overlays the second portion of the graphical element, wherein outputting the first content comprises determining, based at least in part on a priority associated with the first content, an amount of the first content to output for display, and wherein outputting the second content comprises determining, based at least in part on a priority associated with the second content, an amount of the second content to output for display.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
responsive to receiving a notification, identifying, by a computing device, first and second portions of a graphical element, wherein the graphical element has been determined to be associated with an originator of the notification;
outputting, by the computing device and for display, the first and second portions of the graphical element;
determining, by the computing device, first and second portions of message content, wherein the first and second portions of the message content comprise different portions of a message that is associated with the notification;
for a first period of time, outputting, by the computing device and for display, the first portion of the message content but not the second portion of the message content, such that the first portion of the message content, as displayed, at least partially overlays the second portion of the graphical element; and
after the first period of time, and for a second period of time, outputting, by the computing device and for display, both the first and second portions of the message content, such that the first and second portions of the message content, as displayed, at least partially overlay the second portion of the graphical element.

2. The method of claim 1, further comprising:
determining a third portion of the message content, wherein the first, second, and third portions of the message content comprise different portions of the message associated with the notification; and
after the second period of time, outputting the first, second, and third portions of the message content, such that the first, second, and third portions of the message content, as collectively displayed, at least partially overlay both the first and second portions of the graphical element.

3. The method of claim 1, wherein:
the notification comprises an indication of an incoming communication;
the first and second portions of the graphical element comprise first and second portions of an image that are associated with respective first and second portions of a face of a human user, wherein the human user has been determined to be an originator of the incoming communication; and
the message content is associated with the incoming communication.

4. The method of claim 3, wherein identifying the first and second portions of the graphical element comprises:
identifying, based at least in part on location information for a plurality of facial features of the face of the human user, the first portion of the image that is associated with the first portion of the face of the human user, wherein the location information associates each of the plurality of facial features with a corresponding region at which the respective facial feature is represented in the image, and wherein the first portion of the face of the human user includes a first group of one or more of the plurality of facial features; and
identifying, based at least in part on the location information, the second portion of the image that is associated with the second portion of the face of the human user, wherein the second portion of the face of the human user includes a second group of one or more of the plurality of facial features, the second group being different than the first group.

5. The method of claim 4, further comprising:
performing image recognition on the image to obtain the location information.

6. The method of claim 1, wherein the notification comprises an indication of one of an email, a message, a social media communication, a calendar reminder, a travel-related communication, a game-related communication, a stock-related communication, or a weather-related communication.

7. A computer-readable storage device storing instructions that, when executed, cause at least one processor to perform operations comprising:
- responsive to receiving a notification, identifying first and second portions of a graphical element, wherein the graphical element has been determined to be associated with an originator of the notification;
- outputting, for display, the first and second portions of the graphical element;
- determining first and second portions of message content, wherein the first and second portions of the message content comprise different portions of a message that is associated with the notification;
- for a first period of time, outputting, for display, the first portion of the message content but not the second portion of the message content, such that the first portion of the message content, as displayed, at least partially overlays the second portion of the graphical element; and
- after the first period of time, and for a second period of time, outputting, for display, both the first and second portions of the message content, such that the first and second portions of the message content, as displayed, at least partially overlay the second portion of the graphical element.

8. The computer-readable storage device of claim 7, wherein the instructions, when executed, cause the at least one processor to perform further operations comprising:
- determining a third portion of the message content, wherein the first, second, and third portions of the message content comprise different portions of the message associated with the notification; and
- after the second period of time, outputting the first, second and third portions of the message content, such that the first, second, and third portions of the message content, as collectively displayed, at least partially overlay both the first and second portions of the graphical element.

9. The computer-readable storage device of claim 7, wherein:
- the notification comprises an indication of an incoming communication;
- the first and second portions of the graphical element comprise first and second portions of an image that are associated with respective first and second portions of a face of a human user, wherein the human user has been determined to be an originator of the incoming communication; and
- the message content is associated with the incoming communication.

10. The computer-readable storage device of claim 9, wherein the instructions that, when executed, cause the at least one processor to identify the first and second portions of the graphical element comprise instructions that, when executed, cause the at least one processor perform operations comprising:
- identifying, based at least in part on location information for a plurality of facial features of the face of the human user, the first portion of the image that is associated with the first portion of the face of the human user, wherein the location information associates each of the plurality of facial features with a corresponding region at which the respective facial feature is represented in the image, and wherein the first portion of the face of the human user includes a first group of one or more of the plurality of facial features; and
- identifying, based at least in part on the location information, the second portion of the image that is associated with the second portion of the face of the human user, wherein the second portion of the face of the human user includes a second group of one or more of the plurality of facial features, the second group being different than the first group.

11. A computing device, comprising:
at least one processor; and
a computer-readable storage device storing instructions, wherein the at least one processor executes the instructions to:
- responsive to receiving a notification, identify first and second portions of a graphical element, wherein the graphical element has been determined to be associated with an originator of the notification;
- output, for display, the first and second portions of the graphical element;
- determine first and second portions of message content, wherein the first and second portions of the message content comprise different portions of a message that is associated with the notification;
- for a first period of time, output, for display, the first portion of the message content but not the second portion of the message content, such that the first portion of the message content, as displayed, at least partially overlays the second portion of the graphical element; and
- after the first period of time, and for a second period of time, output, for display, both the first and second portions of the message content, such that the first and second portions of the message content, as displayed, at least partially overlay the second portion of the graphical element.

12. The computing device of claim 11,
wherein the at least one processor further executes the instructions to:
- determine a third portion of the message content, wherein the first, second, and third portions of the message content comprise different portions of the message associated with the notification; and
- after the second period of time, output the first, second, and third portions of the message content, such that the first, second, and third portions of the message content, as collectively displayed, at least partially overlay both the first and second portions of the graphical element.

13. The computing device of claim 11, wherein:
the notification comprises an indication of an incoming communication;
the first and second portions of the graphical element comprise first and second portions of an image that are associated with respective first and second portions of a face of a human user, wherein the human user has been determined to be an originator of the incoming communication; and
the message content is associated with the incoming communication.

14. The computing device of claim 13, wherein the at least one processor executes the instructions to identify the first and second portions of the graphical element at least by:
- identifying, based at least in part on location information for a plurality of facial features of the face of the human user, the first portion of the image that is associated with the first portion of the face of the human user, wherein the location information associates each of the plurality of facial features with a corresponding region at which the respective facial feature is represented in the image, and wherein the first portion of the face of the human user includes a first group of one or more of the plurality of facial features; and identifying, based at least in part on the location information, the second portion of the image that is associated with the second portion of the face of the human user, wherein the second portion of the face of the human user includes a second group of one or more of the plurality of facial features, the second group being different than the first group.

\* \* \* \* \*